(12) United States Patent
Arteaga

(10) Patent No.: US 10,302,759 B1
(45) Date of Patent: *May 28, 2019

(54) AUTOMATIC DEPENDENT SURVEILLANCE BROADCAST (ADS-B) SYSTEM WITH RADAR FOR OWNSHIP AND TRAFFIC SITUATIONAL AWARENESS

(71) Applicant: The United States of America as Represented by the Administrator of NASA, Washington, DC (US)

(72) Inventor: Ricardo A Arteaga, Lancaster, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 386 days.

This patent is subject to a terminal disclaimer.

(21) Appl. No.: 15/149,451

(22) Filed: May 9, 2016

Related U.S. Application Data

(63) Continuation-in-part of application No. 13/785,661, filed on Mar. 5, 2013, now Pat. No. 9,405,005.

(51) Int. Cl.
| | |
|---|---|
| *G01S 13/91* | (2006.01) |
| *G01S 13/93* | (2006.01) |
| *G01S 13/86* | (2006.01) |
| *G01S 19/03* | (2010.01) |
| *G01S 7/00* | (2006.01) |

(52) U.S. Cl.
CPC .......... *G01S 13/9303* (2013.01); *G01S 7/003* (2013.01); *G01S 13/86* (2013.01); *G01S 19/03* (2013.01)

(58) Field of Classification Search
CPC ... G01S 13/91; G01S 13/9303; G08G 5/0013; G08G 5/0021; G08G 5/0026; G08G 5/006; G08G 5/0069; G08G 5/0082; G08G 5/0091; G08G 5/045
USPC .......................................................... 342/32
See application file for complete search history.

(56) References Cited

U.S. PATENT DOCUMENTS

| | | | |
|---|---|---|---|
| 9,405,005 B1* | 8/2016 | Arteaga ................. | G01S 13/91 |
| 2003/0004641 A1* | 1/2003 | Corwin ................. | G01S 13/782 |
| | | | 701/301 |
| 2012/0209457 A1* | 8/2012 | Bushnell ................ | G01C 21/00 |
| | | | 701/13 |
| 2013/0176163 A1* | 7/2013 | Margolin ................ | G01S 5/12 |
| | | | 342/118 |

* cited by examiner

*Primary Examiner* — Timothy A Brainard

(57) ABSTRACT

The present invention proposes an automatic dependent surveillance broadcast (ADS-B) architecture and process, in which priority aircraft and ADS-B IN and radar traffic information are included in the transmission of data through the telemetry communications to a remote ground control station. The present invention further proposes methods for displaying general aviation traffic information in three and/or four dimension trajectories using an industry standard Earth browser for increased situation awareness and enhanced visual acquisition of traffic for conflict detection. The present invention enable the applications of enhanced visual acquisition of traffic, traffic alerts, and en-route and terminal surveillance used to augment pilot situational awareness through ADS-B IN display and information in three or four dimensions for self-separation awareness.

23 Claims, 23 Drawing Sheets

AUTOMATIC DEPENDENT SURVEILLANCE BROADCAST (ADS-B) SYSTEM WITH RADAR FOR OWNSHIP AND TRAFFIC SITUATIONAL AWARENESS

CROSS-REFERENCE TO RELATED APPLICATIONS

The present application is a continuation-in-part of U.S. patent application Ser. No. 13/785,661 filed on Mar. 5, 2013 (which in turn derives priority from U.S. provisional patent application Ser. No. 61/637,563 filed on 24 Apr. 2012).

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND a. Field of Invention

The invention relates to aircraft telemetry and control systems suitable for use in an unmanned aerial system (UAS) and, more particularly, to an ADS-B architecture for use in both manned and unmanned aircraft that provides airborne or ground control station (GCS) pilots with enhanced ownship and traffic situational awareness.

b. Background of the Invention

The Federal Aviation Administration (FAA) promulgates both Visual flight Rules (VFR) and Instrument Flight Rules (IFR) for all manned aircraft. VFR regulations require a pilot to be able to see outside the cockpit, and to control the aircraft's attitude, navigate, and avoid obstacles and other aircraft. However, an airborne pilot's cockpit instrumentation offers very limited en-route and terminal surveillance to augment the pilot's situational awareness, and offers minimal information on surrounding traffic, nor any traffic alerts.

The dearth of situational information is even more pronounced for Unmanned Aerial Systems (UASs) such as drones, which have no onboard pilot to perform the see and avoid function. Currently, UASs can only fly domestically in our National Airspace System with a Certificates of Approval (COA) or Experimental Airworthiness Certificate issued by the FAA. The FAA will only issue these certificates if a qualified ground observer or qualified personnel in a manned chase aircraft can perform the See-And-Avoid (S&A) function.

The demand for UASs is proliferating among the military, civil government, and private sectors due to significant improvements in their capabilities and performance. UAS-related research and innovation is driving the creation of companies and jobs, and UAS innovation has dramatically reduced the cost of aerial surveillance for law enforcement agencies and private companies. However, the proliferation of UASs is causing challenges as well. Without a regulatory framework, a large number of UASs in U.S. airspace would endanger commercial airlines and private aircraft. The FAA has not yet established Federal Aviation Regulations (FARs) for UASs to fly routinely in U.S. airspace. However, the FAA has been charged with developing a comprehensive plan for the integration of private UASs into U.S. airspace by late 2015.

It is reasonable to assume that any new FAA rules will impose requirements similar to manned aircraft. The FAA is mandating every aircraft operating within its airspace, where a transponder is currently required, to be equipped with Automatic dependent surveillance-broadcast (ADS-B) Out by Jan. 1, 2020. ADS-B is the satellite-based successor to radar. ADS-B makes use of GPS technology to determine and share precise aircraft location information, and streams additional flight information to the cockpits of properly equipped aircraft. ADS-B is a more reliable system for detecting and avoiding both cooperative aircraft and, importantly, non-cooperative aircraft such as parachutists, balloons, and manned aircraft without radios or navigation aids. Indeed, proposed FAR rules have been discussed. Any new FAA rules for UASs will inevitably impose strict standards for UASs, and is very likely to require some form of ADS-B-based collision avoidance technology. Unfortunately, current ADS-B Out lacks enhanced visual acquisition of real time traffic. Conventional ADS-B Out schema only transmit the immediate aircraft's position and velocity information automatically and periodically (at least once every second) without flight crew or operator intervention. Only air traffic controllers currently have information on surrounding aircraft positions, and the UAS's GCS has no information on surrounding aircraft or threats. Moreover, conventional aerospace telemetry networks require the use of efficient domain-specific protocols at the transport, network, and routing layers to protect against temporary loss of telemetry. However, the existing GCS devices (conventional computers) and services are based on legacy protocols such as wireless radio frequency communications via serial asynchronous protocols that serves as a conduit to assure the necessary UAS pilot situational awareness. ADS-B is susceptible to temporary loss of telemetry between the GCS, and if ADS-B data were to be transmitted using serial asynchronous or TCP/IP protocol it would be highly susceptible to telemetry loss. The loss of telemetry can occur from various factors such as simple line of sight distance, interference, to atmospheric disturbances. These constraints make conventional ADS-B ill-suited for remote-piloted UASs were situational awareness and conflict situational awareness is extremely limited.

One solution is for every GCS to transmit their UAS coordinates to air traffic control and let them consolidate and analyze all their data, inclusive of all UASs under their command. United States Patent Application 20100066604 by Limbaugh et al. (Kutta Technologies, Inc.) published Mar. 18, 2010 shows an unmanned aerial system (UAS) position reporting system in which an air traffic control reporting system (ATC-RS) receives position data of a UAS from its ground control station (GCS) and communicates the position of the UAS to a civilian air traffic control center (ATC) or to a military command through an ADS-B signal or through a TIS-B signal through the ADS-B and TIS-B transceiver. The ATC-RS is adapted to display the position of the UAS in the airspace on a display screen. This solution is cumbersome inasmuch as it requires four separate data transmissions to avoid a collision, and it is highly prone to temporary loss of telemetry.

A better solution is to use a UAS's ADS-B Out transceiver as a "repeater" to transmit not just the immediate aircraft discretes, but also other priority aircraft and ADS-B IN traffic information in the ADS-B telemetered signal. This way the GCS has all the data in one downlink.

U.S. Pat. No. 6,064,335 to Eschenbach (Trimble) issued May 16, 2000 shows a GPS based ADS-B system in which any properly equipped aircraft can know the position and heading of all neighboring aircraft. Each aircraft utilize GPS technology to determine its position and heading, and these discretes are transmitted to other ADS-B equipped aircraft, as well as ground control. Each aircraft in the vicinity would receive the GPS squitter and track the position and progress of neighboring aircraft, thus implementing a GPS squitter Traffic Alert and Collision Avoidance System (TCAS). Despite suggesting the repeater concept, the Trimble collision avoidance system only uses it to give a manned aircraft a way of visually cross-checking air traffic alerts from squitter avionics with air traffic controller communications. The suggested system is not adapted for use in a UAS and does not disclose a turnkey communication network between air and GCS.

What is needed is an ADS-B system that is more fully adapted for both airborne pilots and UAS pilots to provide a more comprehensive and failsafe detection and warning system to avoid accidents. Otherwise, impending FAA regulations are expected to severely limit the range and conditions under which UASs can operate. Disclosed herein is a system and method for ADS-B adapted for UASs to give them a new capability—to periodically transmit the ownship three-dimensional position and airspeed, as well as that of other surrounding aircraft in the vicinity, to the GCS and to use an ADS-B functional redundancy via a secure UDP/IP network link that is impervious to temporary telemetry loss for increased UAS situational awareness in uncertain environments. The system may also be deployed in the cockpit of conventional aircraft for enhanced ownship and traffic situational awareness of the airborne pilot.

SUMMARY OF THE INVENTION

It is, therefore, an object of the present invention to provide an ADS-B system coupled to a manned or unmanned aerial vehicle for increased situational awareness and self-separation assurance including methods for ADS-B functional redundancy.

It is another object to provide an ADS-B system adapted for use in a UAS to provide increased situational awareness and a self-separation assurance system to avoid accidents.

It is another object of the invention to provide an UAS-ADS-B architecture that provides UAS GCS operators with comprehensive ownship and traffic situational awareness by inclusion of surrounding traffic information in the transmission of data through the GCS telemetry downlink using serial and/or a secure packet-based IP network to the GCS.

It is another object to integrate radar within the UAS-ADS-B architecture for increased situational awareness and self-separation assurance.

It is another object of the invention to provide an UAS-ADS-B architecture in which ADS-B data is received at a GCS via telemetry downlink, wherein a software lost-link detector senses a loss of telemetry link and compensates for temporary loss of telemetry between the GCS.

It is another object to provide methods for displaying ADS-B traffic information in three and four dimensions at the GCS using an industry standard Earth browser for the visual acquisition of traffic and situational awareness, and for consolidating the above-mentioned display with weather, restricted airspace, and satellite imagery information on the Earth browser for hazard avoidance.

It is another object to provide autonomous GCS software algorithms for traffic situation awareness and alerting of potential collisions or hazardous traffic situations, based on separation and collision zones surrounding the aircraft.

According to the present invention, the above-described and other objects are accomplished by providing an ADS-B system for increased situational awareness and self-separation assurance employing methods for ADS-B functional redundancy. The invention is especially suited (and is herein described) in the unmanned context in which a UAS is capable of telemetering the position of the "ownship" in addition to the location of surrounding aircraft, as well as FAA and other data, to a ground control station (GCS) in real time. At the UAS, the ADS-B system uses a Universal Access Transceiver (UAT) to receive air-to-air ADS-B In messages direct from aircraft nearby, as well as ADS-R and TIS-B messages from ground based transceivers. The ADS-B messages are received by UAT antennas and are processed by the ADS-B UAT as ADS-B/ADS-R/TIS-B message reports. The ADS-B message packets are transmitted to an ADS-B ground control station (GCS) laptop via a telemetry Radio Frequency datalink via serial asynchronous protocol. The transmitted message packets include heartbeat, ownship, and traffic reports.

The complete system architecture relies on an IP network background and incorporates redundancy via the internet. The ADS-B data is transmitted encrypted to the UAS GCS using UDP/IP protocol to meet FAA security data requirements. The GCS laptop employs "lost-link" detection software to sense any loss of telemetry link and to compensate. If the lost-link software senses a loss of telemetry link resulting from either the downlink telemetry between the UAS and the GCS being lost, or the data corrupted, the lost-link software automatically switches over to the FAA secure center data stream and provide near real time substitute data to the operator. The redundancy of data adds aircraft situational awareness even during the loss of telemetry.

The invention also provides a GCS architecture and geo-browser software application at the GCS that parses incoming ADS-B messages and converts the ADS-B data to a keyhole markup (KML) format for display purposes. The dynamic KML files are written to an industry Earth browser (Google Earth Pro® or the like), which reads the KML files and displays the ownship and traffic information spatially, providing 3D synthetic views of the UAS and its surroundings as well as projected future positions of the UAS and other aircraft. A key aspect of the visual display is that all traffic aircraft models are accompanied with 3D color-coded contrails as an aide to visual acquisition of traffic targets. The ownship data may be selectively overlayed with other downlink data such as weather, FAA Notice To Airmen (NOTAMS), keep out zones, and other relevant information. The consolidation of ADS-B information with telemetry communications allows real-time traffic information to be available to the UAS operator.

A novel algorithm is also proposed for traffic situation awareness and alerting of potential collisions or hazardous traffic situations. Automatic traffic alerts are generated based on separation and collision zones surrounding the aircraft, respectively.

The same geo-browser display provided at the GCS may be deployed in the cockpit of conventional aircraft for enhanced ownship situational awareness of the airborne pilot.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION OF THE PREFERRED EMBODIMENT

Figure 1:
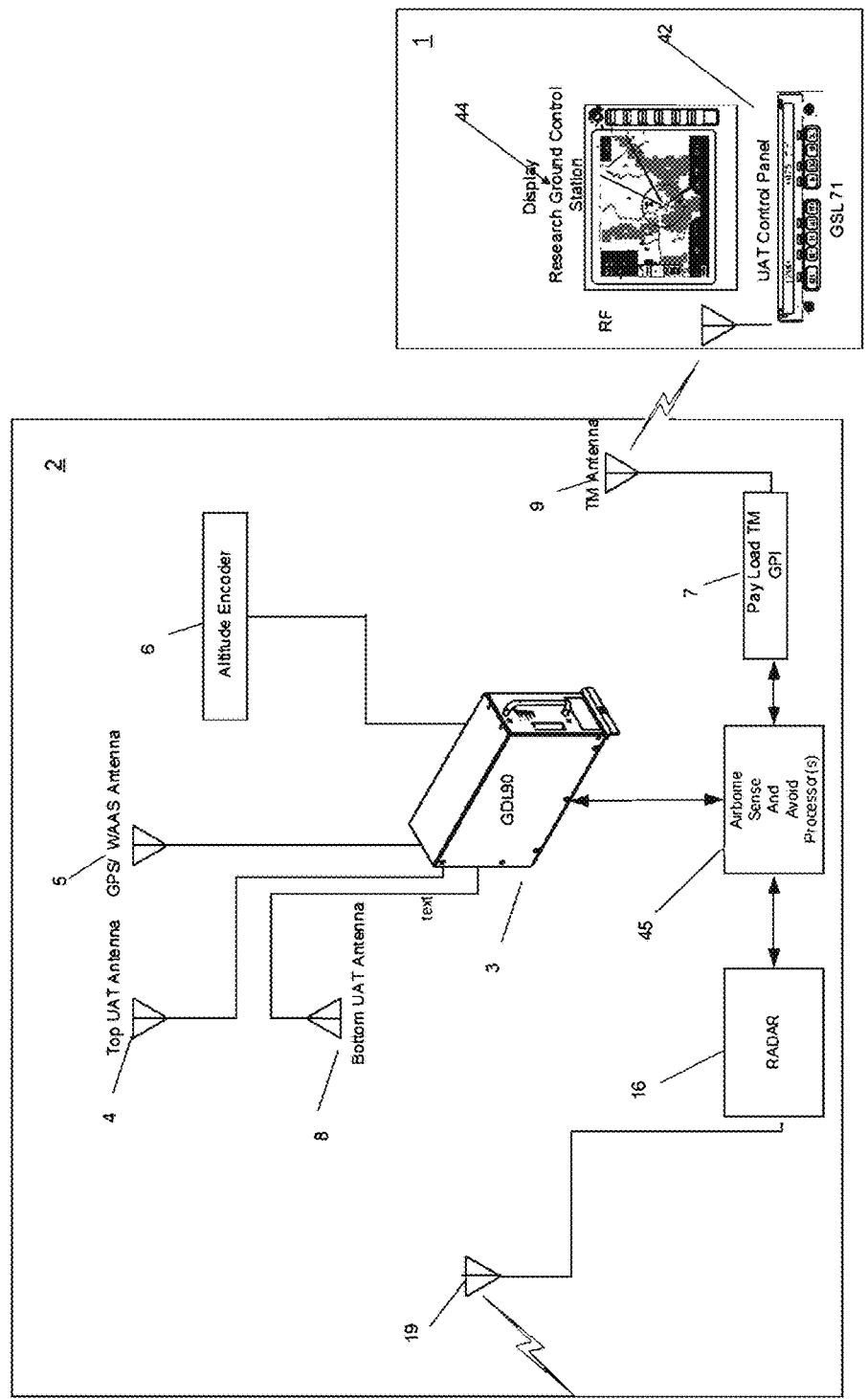
FIG. 1 is a block diagram of the overall system architecture.

The present invention is a hardware and software architecture that integrates Automatic Dependence Surveillance Broadcast (ADS-B) surveillance technology to an unmanned aircraft system (UAS), with improved communications and sophisticated display capabilities to provide increased situational awareness and a self-separation assurance system to avoid accidents. The ADS-B system architecture is especially suited for UAS' because it integrates: 1) UAS flight qualified customized ADS-B hardware; 2) radar; 3) wireless radio frequency datalink telemetry for vehicle communications; 4) loss link functional redundancy of ADS-B/ADS-R/TIS-B data, special use airspace data, and hazardous weather data via secure internet communication; 5) a software architecture with novel algorithms for real-time ADS-B data integration, conflict detection and alerting, and control logic for loss of UAS telemetry link; and 6) a synthetic vision display using a fully-integrated geobrowser for three dimensional graphical representations for ownship and air traffic situational awareness.

The following is a list of acronyms used, which are used throughout the description of the preferred embodiment:
ADS-B Automatic Dependent Surveillance-Broadcast
IPv6 Internet Protocol version 6
GBT Ground Based Transceiver (ADS-B)
GCS Ground Control Station
GPS Global Positioning System
LIDAR Light Dection and Ranging
NACp Navigation Accuracy Category Position
NIC Navigation Integrity Category
RADAR Radio Detection and Ranging
SBS Surveillance Broadcasting Services (ADS-B)
TCP Transport Layer Protocol
TIS-B Traffic Information Services-Broadcast
UDP User Datagram Protocol
UAS Unmanned Aircraft System
UAT Universal Access Transceiver
UTC Universal Time Coordinated
WAAS Wide Area Augmentation System In accordance with the invention, priority aircraft and ADS-B IN traffic information are included in the transmission of data through the telemetry communications to a remote ground control station (GCS). In addition to accurate location and UAS operational data, the inclusion of ADS-B information with local radar and telemetry communications allows real-time traffic information to be available to the UAS operator located at the GCS. Furthermore, the RADAR/ADS-B data is displayed to the operator on an industry standard Earth browser to provide an enhanced visual display with three and/or four dimension trajectories for increased situation awareness and enhanced visual acquisition of traffic for conflict detection. This increased situational and traffic awareness is a preeminent attribute for successful UAS operations and greatly improves safety for the UAS, other aircraft in the area, and nearby ground facilities and personnel. The embodiments disclosed herein offer a new capability for ADS-B surveillance redundancy, the system provides for automatic internet connection to the FAA technology center and Surveillance Broadcasting Services in the event that the telemetry signal is lost. In this "lost link" scenario, ADS-B data from the FAA tech center sent via a secure IP network can be used to track the UAS until the primary signal can be recovered.

FIG. 1 is a block diagram of the system architecture of both UAS 2 and GCS 1. The UAS 2 architecture includes an ADS-B Universal Access Transceiver (UAT) 3 mounted in the UAS 2, and connected to a top-mounted UAT antenna 4, a top-mounted GPS/WAAS antenna 5, a bottom-mounted UAT antenna 8, a multi-channel sense-and-avoid miniature radar device 16 with radar antenna(s) 19, and an altitude encoder 6. Note that UAS composite airframes require a metal ground plane of at least eight inches for the proper transmission and reception of ADS-B messages. This radio frequency (RF) ground plane may be installed beneath the airframe skin, or on the outside of the airframe. The UAS 2 is also equipped with an existing generic payload interface/man-machine interface (GPI/MMI) 7 controller in communication with the UAT 3. One skilled in the art will understand that the GPI/MMI 7 controller may be a standalone computer component or part of a more extensive integrated modular avionics (IMA) architecture. The GPI/MMI 7 is provided with a generic payload communication interface in the UAS 2 which includes a wireless (RF) telemetry datalink via Telemetry antenna 9 to GCS 1 for remote control of the UAS 2 via its mission computer, as well as for remote control of the mission payload(s) via GPI/MMI 7. The GPI/MMI 7 is always transmitting for UAS 2 payload (ADS-B) operations and is the primary method of ADS-B and Radar transmission of data used herein. The GCS 1 and associated ground control equipment (to be described)

allows an operator to interactively control both the mission payload functions as well as the control functions of the UAS 2.

UAT 3 is a dual band 978 and/or 1090 Mhz ADS-B transceiver preferably Garmin® GDL 90/88, or Freeflight® XVR ADS-B universal access transceiver or ADS-B Mode S 1090 Mhz exended squitter. The UAT 3 ADS-B transceiver includes a built-in 15 channel GPS/WAAS receiver, is certified to support a broad array of Automatic Dependent Surveillance-Broadcast (ADS-B) broadband services and is factory-configured to broadcast ownship position, velocity, projected track, altitude, and flight identification via RF communications (an RF data link on 978 MHz or 1090 Mhz) to other ADS-B equipped aircraft in the vicinity, as well as to other ground-based transceivers maintained by the FAA. Alternatively, UAT 3 maybe a TSO certified Free Flight® RANGR universal access transceiver using the identical ADS-B message reports. Alternatively, UAT 3 maybe a Technical Standard Order (TSO) certified dual band ADS-B Mode S 1090/978 Mhz extend squitter using the identical ADS-B message reports. The UAT 3 may also provide other ancillary functions, including storage and retrieval of UAS 2 aircraft configuration data. GPS/WAAS antenna 5 is connected to the UAT 3 built-in 15 channel GPS/WAAS receiver. UAT antennas 4, 8 and GPS/WAAS antenna 5 are conventional components. The altitude encoder 6 is also a conventional component that produces digitized pressure information for determining the UAS' 2 pressure altitude. The multi-channel sense-and-avoid miniature radar device 16 is preferably a compact multi-mode radar sensor that combines high quality radar performance and flexible system characteristics, such as shown and described in U.S. Patent Application 20140139366 by Moses et al. published May 22, 2014. Miniature radar device 16 preferably has on-board processing capability with target data processing module that extracts and identifies potential targets based on the filtered RF signals. Radar device 16 is connected to radar antenna(s) 19, which are/is a conventional omnidirectional radar antenna and directional receiving antennas.

The UAT 3 is inherently capable of ADS-B Out broadcasts of ownship UAS ADS-B data. For this, the UAT 3 determines the UAS ownship position/velocity from a built-in fifteen (15) channel GPS/WAAS receiver in the UAT 3 transponder unit, receiving signals from GPS/WAAS antenna 5. The UAT 3 inputs pressure/altitude from altitude encoder 6 to broadcast ownship pressure altitude information. The upper and lower UAT antennas 4, 8 provide line-of-sight transmission and reception of ADS-B broadcasts. The UAT 3 also receives a system maintenance input as required for the configuration and maintenance of the ADS-B system, and also receives pilot input from the Ground Control Station (GCS) 1.

Figure 2:
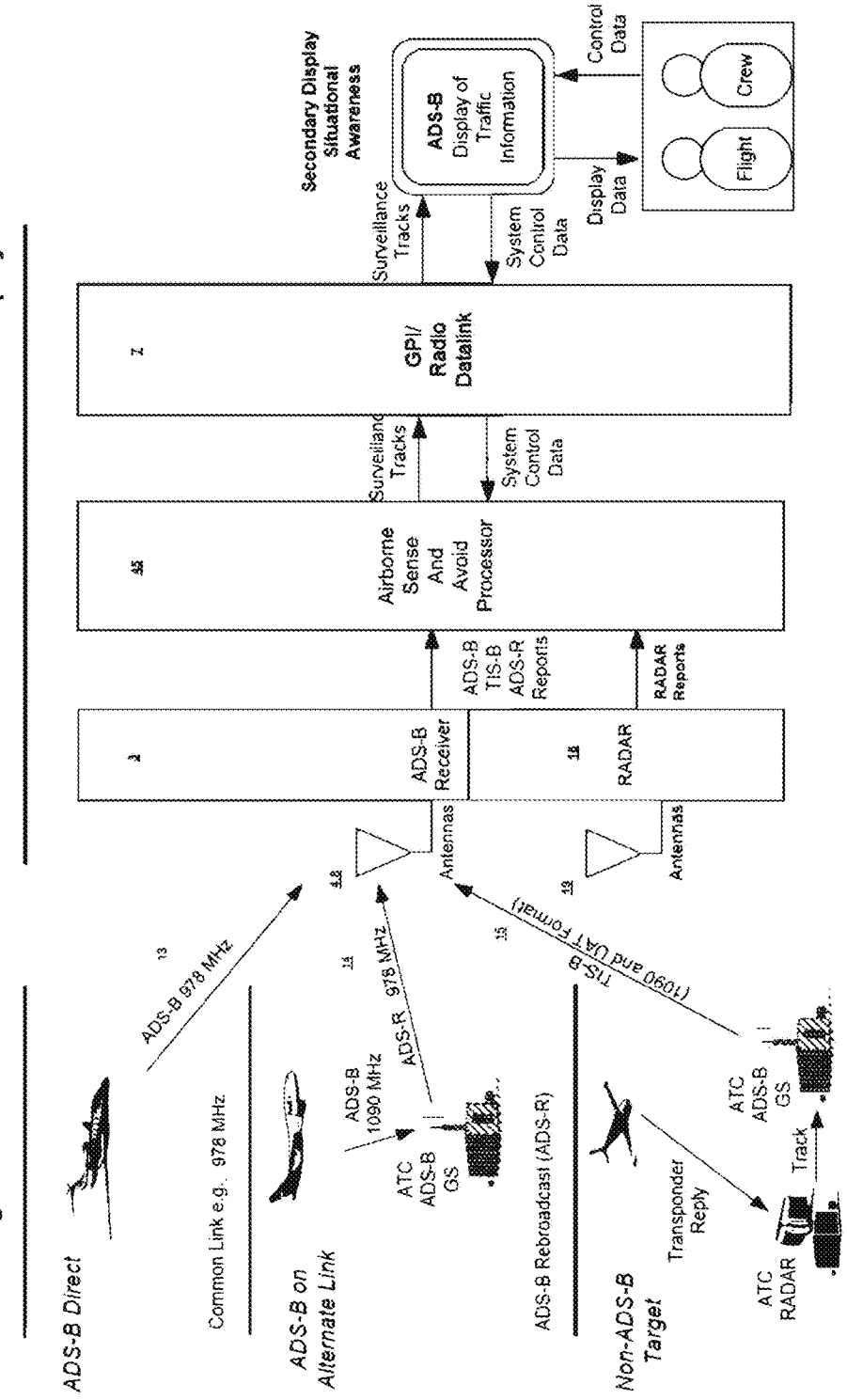
FIG. 2 illustrates the ADS-B IN overview for processing ADS-B/ADS-R/TIS-B traffic reports.

FIG. 2 is a block diagram of the ADS-B In system architecture in UAS 2. UAT 3 is inherently capable of ADS-B-In reception of air-to-air ADS-B messages direct from aircraft nearby and air-to-ground ADS-B/ADS-R/TIS-B messages from ADS-B ground based transceiver(s), though it is not inherently configured to re-transmit them. In accordance with the present invention, the air-to-air ADS-B In messages 13 from aircraft nearby, air-to-ground ADS-R messages 14 and TIS-B 15 messages from ADS-B ground based transceiver(s) are received and processed from encoded ADS-B Out transmission of other aircraft. More specifically as seen in FIG. 2, the ADS-B In messages 13, ADS-R messages 14 and TIS-B 15 messages are received by the UAT 3 via UAT antennas 4, 8 and are processed by the UAT 3 as ADS-B/ADS-R/TIS-B message reports. Similarly, the sense-and-avoid radar data from miniature radar device 16 is transmitted via omnidirectional radar antenna 19 and received by receiving antennas and then processed by the radar 16 which performs radar interferometry target extraction. The identified radar target(s) data is "fused" with the ADS-B/ADS-R/TIS-B message reports. These fused radar/ADS-B In message reports are temporarily stored by an Airborne Sense and Avoid processor (ASAP) 45 (described below with reference to FIG. 3), are UTC time tagged, and are encoded in the packet-based radar/ADS-B messages and are sent via serial asynchronous communications to the GCS 1.

In general, the serial order sequence is ADS-B out ownship messages, which are sent and then followed by ADS-B In traffic message reports, then radar target data. The UAT 3 is reprogrammed to do this for ADS-B Out/In by enabling both transmit (Tx) and receive (Rx) during initial setup installation using the provided instrument programming interface. Thus, the UAS 2 ADS-B Out UAT 3 transceiver effectively transmits not just the ownship UAS 2 discretes, but also other surrounding priority aircraft and ADS-B In traffic information, all in "consolidated" ADS-B message reports. This way the GCS 1 has all the data in one downlink. This process is detailed below in regard to FIG. 3.

Figure 3:
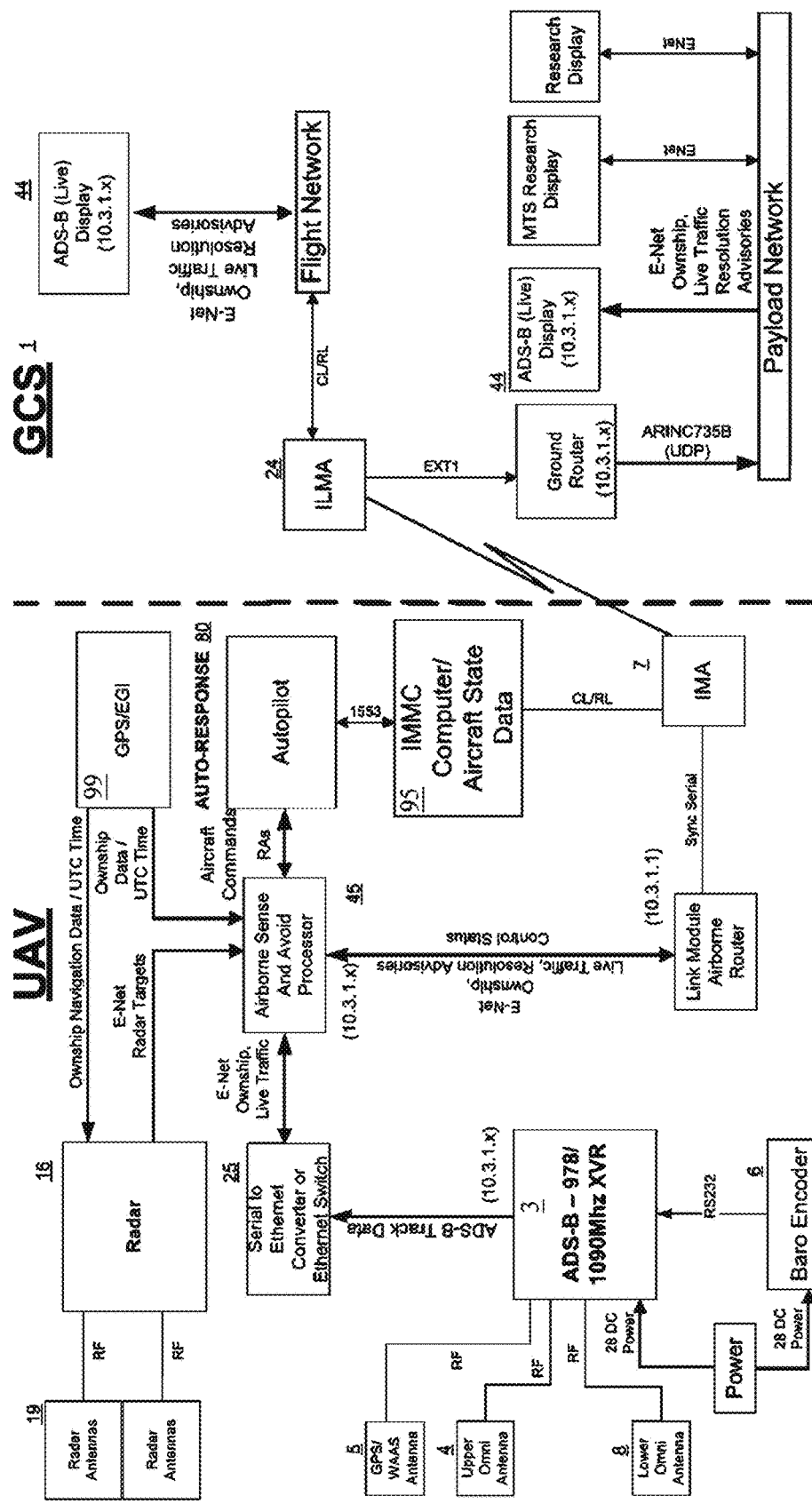
FIG. 3 is a schematic block diagram illustrating the control interfaces of the ADS-B and GPI/MMI 7 transmission between the UAS aircraft 2 and the GCS 1.

The consolidated ADS-B Out/ADS-B In/radar message packets are transmitted to the ADS-B Display 44 at GCS 1 using the existing UAS-ADS-B payload telemetry, e.g., GPI/MMI 7 via its conventional telemetry protocols (from the GPI port at 1 Hz via the existing Telemetry Radio Frequency datalink). In this case any of a variety of radio communications may be used including Ku Satellite Beyond line of sight, C-Band line of sight, UHF line of sight, and S-Band radio communications. However, bandwidth constraints of radio communications limit the amount of ADS-B and radar messages for traffic and real-time weather information. As seen in FIG. 3, to improve the flow of data communications for a plurality of data rates and/or serial protocols, the present invention uses a dedicated converter 25 and ASAP 45 with memory buffers for the consolidated ADS-B Out and ADS-B In messages using UAS serial protocols via telemetry RF communications. Within the UAV the GPS/EGI 99, autopilot 80, Integrated Mission Management Computer (IMMC) 95 and GPI/MMI 7 controller are existing original-equipment components normally found on UAVs. Conversely, the antennas 4, 5, 8 and 19, as well as radar 16, converter 25, ASAP 45, UAT 3 and baro-encoder 6 are not, albeit they may be commercially-available equipment. Specifically, converter 25 may be a commercially-available RS-232/422 converter, and ASAP 45 may be one or more commercially available multi-purpose processor(s) (MPPs), for example, conventional data storage and processing devices each including: (a) a data storage medium for storing commands; (b) a processor for managing the data storage medium and for executing the commands; and (c) a communication interface to allow the processor to communicate to other functional components. Converter 25 and ASAP 45 are interposed between the UAT 3 and payload GPI/MMI 7 as described below, to convert between the data communication protocols of the UAT 3 ADS-B unit and the UAS 2 serial telemetry protocol. Similarly, the inverse RS-422/232 converter 24 is used at GCS 1 to convert between the data communication protocol of the UAS 2 and the Laptop serial protocol used by ADS-B Display 44 (or other networked computers/displays). The ownship ADS-B Out messages contain data such as ownship latitude, longitude, geometric altitude, velocity, heading, and accuracy metrics (compliant with standard GPS accuracy and integrity parameters: NACp, NIC, and SIL). In addition, the UAT 3 receives ADS-B In traffic reports for up to thirty two ADS-B or TIS-B targets, prioritized based on proximity to the ownship UAS. Further, the ASAP 45 receives radar target data for up to 32 targets, prioritized based on proximity to the ownship UAS. Each of the consolidated radar/ADS-B Out message packets are encoded with a checksum to ensure the validity of the telemetry signal (as will be described), and are transmitted to GCS 1 via GPI/MMI 7 and/or via secure internet connectionless communications 27 using encrypted UDP/IP protocol (as will be described).

The GCS 1 is manned by a flight crew and controls/provides the operational status of the ADS-B UAS 2. For this purpose GCS 1 includes a UAT control panel 42 connected to converter 24 and configured to transmit control messages to the UAT 3 via the GPI/MMI 7 telemetry protocols (also refer to FIG. 4). A ground control station display 44 is connected to converter 24, receives the consolidated radar/ADS-B message packets and provides ADS-B status, and displays synthetic 3D/4D views of ownship and traffic information to the UAS pilot. The control station display 44 and UAT control panel 42 may be a conventional PC-based computer such as a laptop, with on-board display and network interface. Alternatively, the functional equivalent of the display 44 and control panel 42 may be provided to the pilot in the cockpit of conventional aircraft for enhanced ownship situational awareness of the airborne pilot. In the latter case, a conventional PC-based tablet computer is preferred, though a cockpit laptop will also suffice. At the GCS 1 all components pictured in FIG. 3 are generally pre-existing original ground control equipment, with the exception of the real-time operator ADSB Display 44.

In the UAS context, GCS 1 allows an operator to fly the UAS 2 by remote control, and allocates three important functions to the UAS operator. The first is system monitoring: the UAS operator should be able to monitor the ADS-B system and ownship navigation. The second is traffic situational awareness: the UAS operator should be informed of traffic data and alerted. The third function is autonomous maneuver awareness: the UAS operator should be informed of the UAS maneuver execution, when the ASAP 45 allows the autopilot 80 to maneuver the UAS 2 autonomously.

FIG. 3 describes the application of an ADS-B and Radar sense and avoid system on an unmanned aircraft for detecting the loss of separation and issuance of a corrective Resolution Advisory (RA) that provides increased separation and collision avoidance. FIG. 3 is an instantiation of a schematic block diagram of a UAS 2 illustrating the control interfaces of the ADS-B, Radar, ASAP and GPI/MMI 7 transmission between the UAS aircraft 2 and the GCS 1, as well as the details of the RS-232/Ethernet conversion. The UAT 3 detects and receives ADS-B traffic information via the UAT antennas 4, 8. The radar 16 detects and receives radar data via one or more radar antennas 19. These surveillance sensors 3, 16 send aircraft track data to the ASAP 45 processor(s) for conflict detection and conflict resolution. A conflict detection algorithm (to be described) resident in ASAP 45 determines future ownship collision volume penetration based on the current airspace surveillance state data. The conflict resolution algorithm resident in ASAP 45 modifies the ownship trajectory of UAS 2 once the conflict detection algorithm detects the loss of separation and issues a corrective Resolution Advisory (RA) that provides increased separation. An RA consists of a single set of waypoints (trajectory change path), plus visual and vocalized alerts, for the ownship UAS 2 that describes a resolution strategy for increasing separation for intruders that are determined to be collision threats. The RA is then sent to the existing autopilot 80 for automonous maneuver execution.

The aircraft traffic data, ownship data from the existing Integrated Mission Management Computer (IMMC) 95, alerts, and resolution advisories are transmitted via a datalink communications system (the existing UAS-ADS-B payload telemetry, e.g., via its GPI/MMI 7 port at 1 Hz using the existing Telemetry Radio Frequency datalink). The surveillance data, alerts and advisories are routed using an airborne and ground routers to the GCS 1 payload and flight network for real-time display 44 to the UAS operator. The converter apparatus 25 converts between the data communication protocols of the UAT 3 ADS-B unit and the UAS 2 datalink protocol (Etheret, RS-422) and the reverse analogue converter 24 is used in GCS 1.

Figure 4:
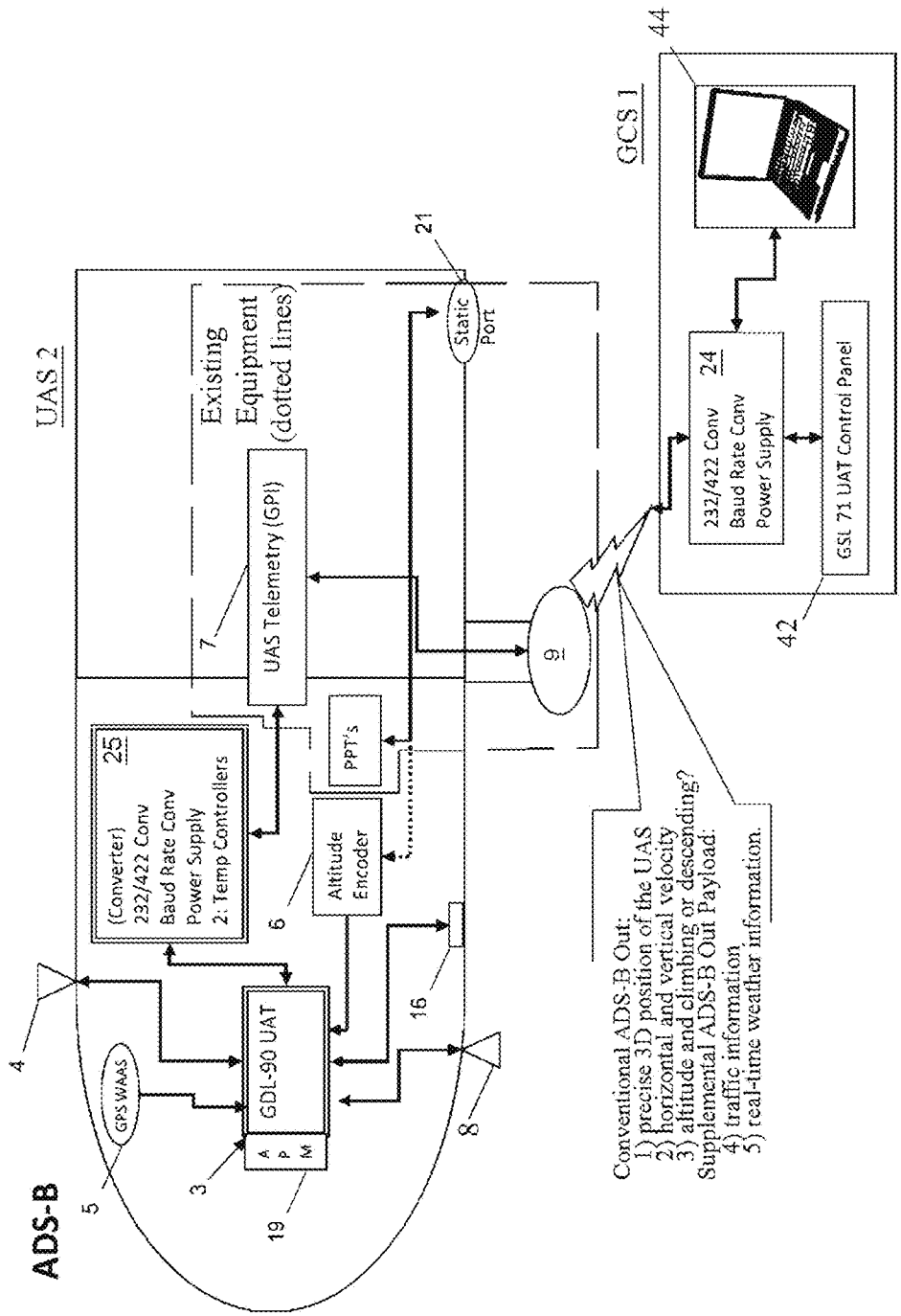
FIG. 4 illustrates an embodiment of the UAS-ADS-B unmanned aircraft system diagram for vehicle installation.

FIG. 4 illustrates an embodiment of the UAS-ADS-B unmanned aircraft system diagram. It should be understood that specialized precautions must be employed to adapt the UAS 2 equipment to operations at high altitudes. For present purposes a heater was incorporated in UAT 3 and converter apparatus 25, with temperature sensors to maintain temperature control to operate at unpressurized altitudes of 55,000 feet and temperatures of −55 degrees C.

Figure 5:
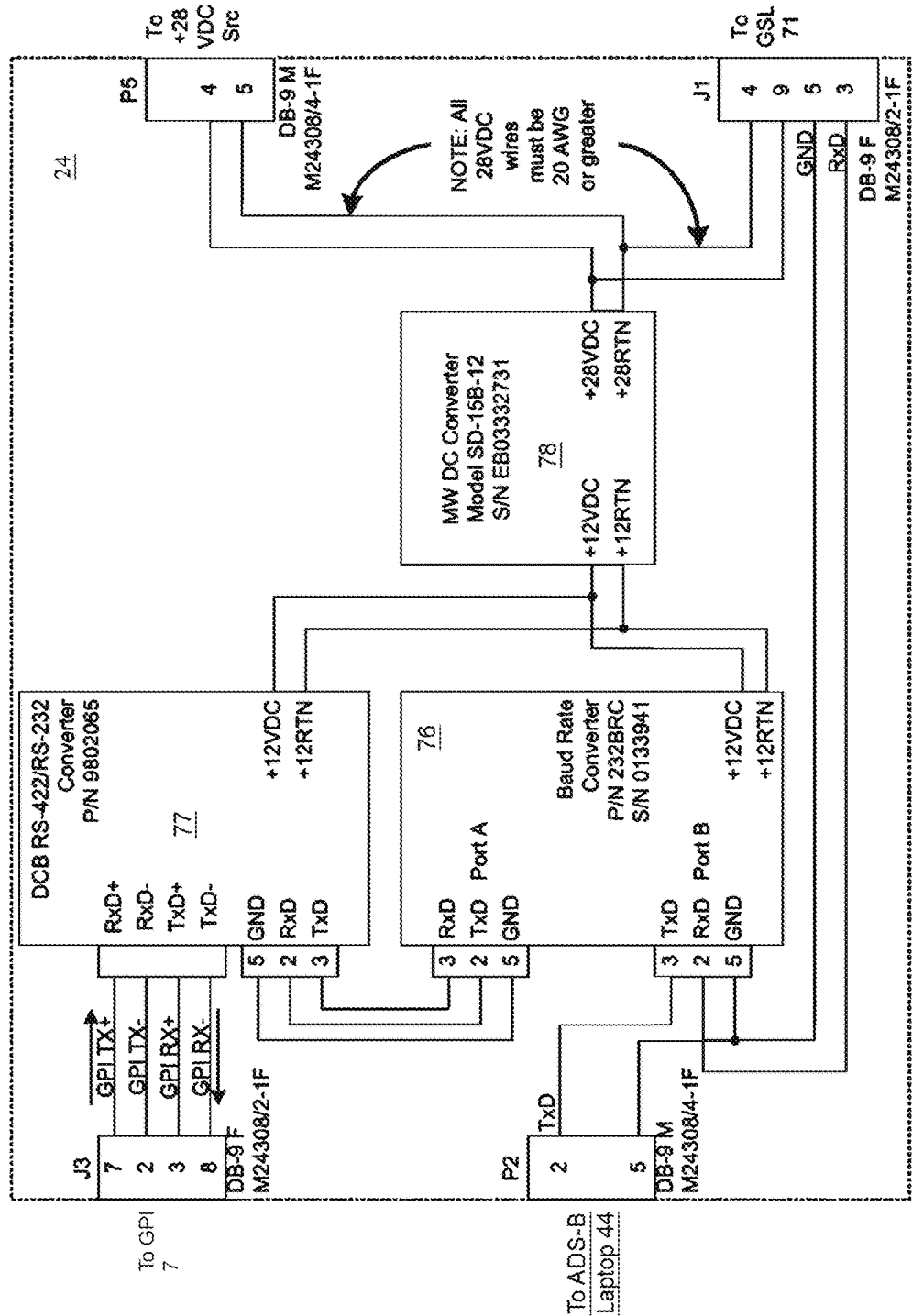
FIG. 5 shows a detailed schematic of the converter apparatus 24.

FIG. 5 shows a detailed schematic of the converter apparatus 24 at the GCS 1. The converter apparatus converts between the data communication protocols of the UAT 3 ADS-B unit and the UAS 2 telemetry protocol and is used in both the UAS 2 and GCS 1. Converter apparatus 24 further comprises a baud rate converter 76 for changing the speed or baud rate of the data passing through, a power converter 78 for converting 28 vdc to 12 vdc, and an RS-232 to RS-422 converter 77 for changing the transmission protocol. All pinouts are given.

GCS 1 UAS-ADS-B Software Architecture

The UAS-ADS-B software resident at GCS 1 includes novel algorithms for ADS-B sensor processing, conflict detection, conflice resolution alerts, displays, and control logic for loss of UAS telemetry link. The software architecture core functionality comprises four software modules for translation, loss-link, self-separation, and synthetic display. The software architecture includes a translation module for generating KML scripts from the UAS-ADS-B data, a loss link redundancy module to compensate for loss link of telemetry, a separation assurance software module for traffic situation awareness and alerting of potential collisions or hazardous traffic situations, and a synthetic display management user-interface for managing the 3D/4D synthetic displays on ground control station display 44. Each of these GCS software modules is described in more detail below.

Figure 6:
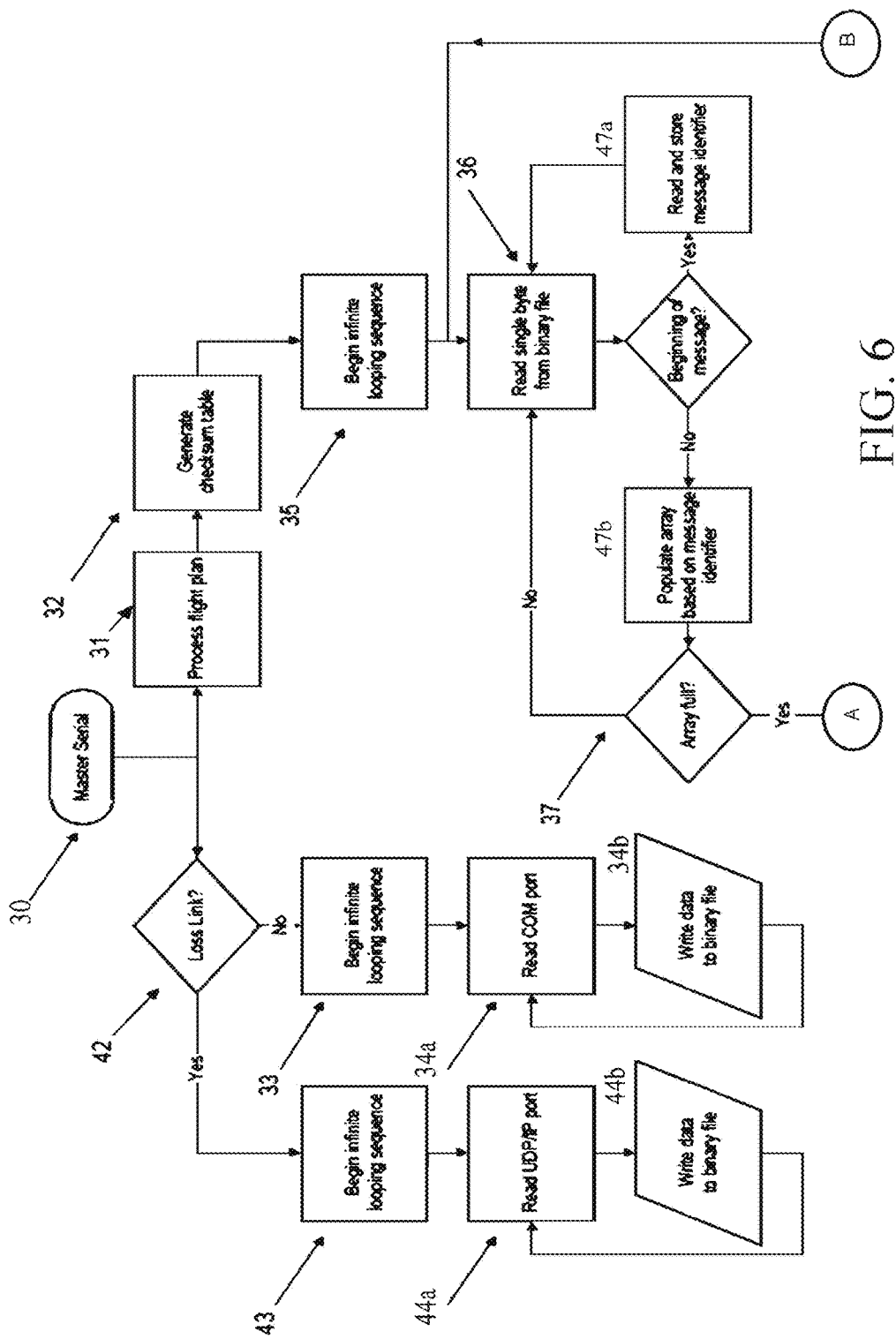
FIG. 6 is a process flow diagram of the software used at GCS 1 ADS-B laptop according to the present invention.
Figure 6:
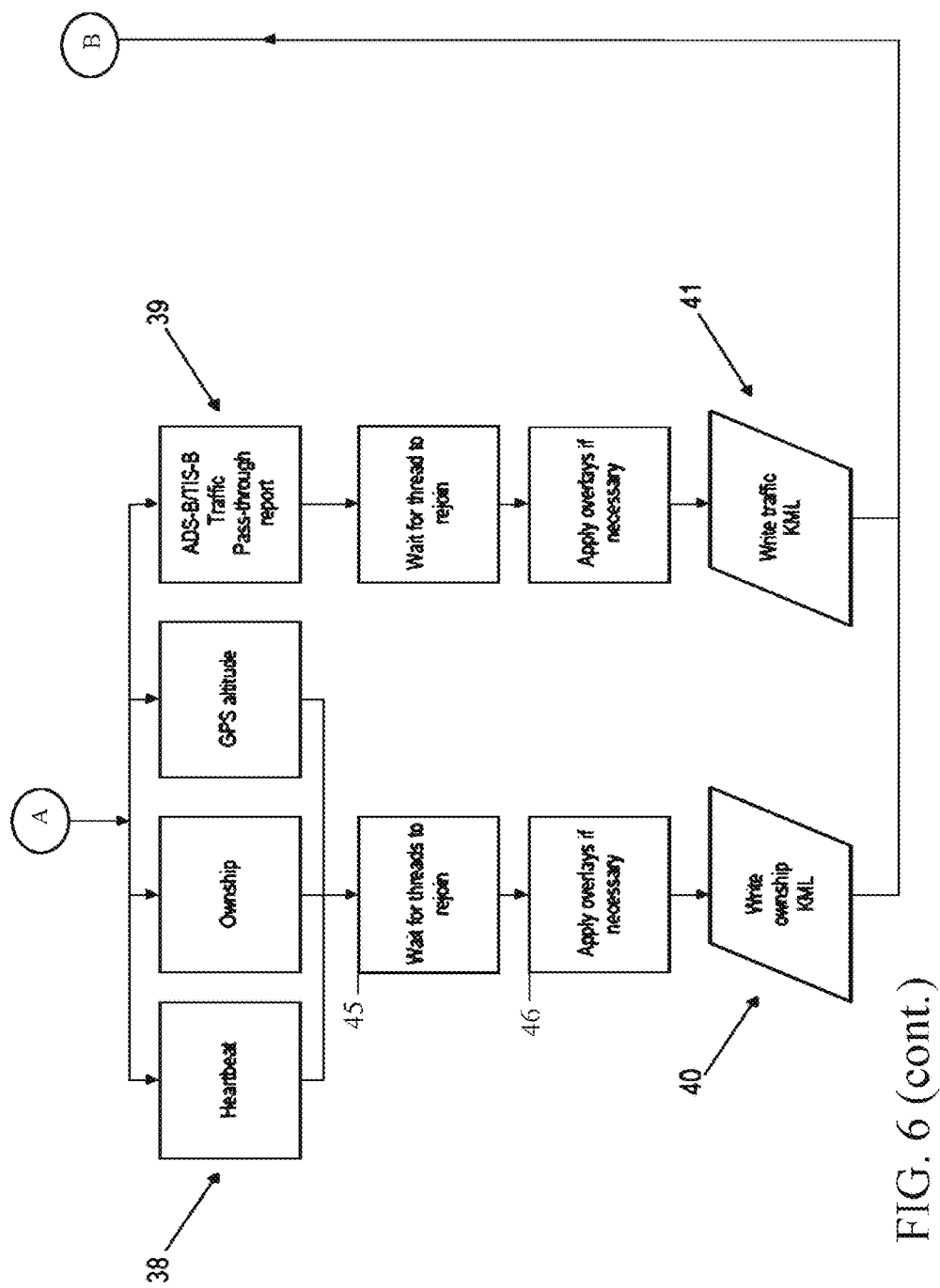

FIG. 6 is a control flow diagram of the software architecture including translation module for generating KML scripts from the UAS-ADS-B data, and loss link redundancy module to compensate for loss link of telemetry, these two modules collectively providing the communication infrastructure for real-time correlation and track processing of ADS-B data. The software architecture uses threading and partitioning for the ownship and the traffic data reports to take maximum advantage of multiple quad-core processors. The software architecture includes a backup parallel design (the Loss Link software module which branches to the left) that must operate only after the radio telemetry communications has failed, and the Translation module which branches to the right.

Translation Module

Generally, the translation module parses all the message packets sent from the ADS-B UAT 3 and writes KML scripts that comprise models and trajectories for the ownship UAS 2. Keyhole markup (KML) is a file format suitable for displaying geographic data in an Earth browser such as Google Earth, Google Maps, NASA World Wind etc. A KML file is processed in much the same way that HTML (and XML) files are processed by web browsers. Each KML file becomes a layer to be used in the virtual globe. The UAS-ADS-B data gleaned from the KML scripts is overlayed on a 3D/4D geobrowser display (an Earth browser such as Google Earth™ Pro) to provide various synthetic views of the UAS 2 and its surroundings as described below, as well as projected future positions of the UAS and other aircraft.

More specifically, and with reference to FIG. 6, at step 30 a Master Serial scheduler 30 governs and schedules all thread processes within the system software, including thread processes for the Loss Link software module which branch to the left, and the Translation module which branches to the right. Once the software is started, all variables are initialized and static variables such as the mission flight plan and a checksum table are computed at steps 31, 32, respectively. The flight plan contains a list of waypoints for the UAS 2 to fly. All flight plans (waypoints) are interpreted from a .txt formatted document generated by a mapping system of choice, such as Falcon View®, a mapping system created by the Georgia Tech Research Institute which displays various types of maps and geographically referenced overlays. A loss link failure test at step 42 (described below) is initialized to null. Once all preliminary operations are complete, the software creates a "serial monitor" thread which monitors and reads the desired serial port's binary data stream. This thread loops indefinitely at step 33, and at step 34(a) reads the desired serial (COM) port and writes all incoming data to a file in hexadecimal format at step 34(b). This write-to-file method was employed to ensure no bytes from the serial stream are lost during data processing and to provide the capability to post-analyze historical flight data and/or replay. After the serial monitor thread is created at step 33, the translation software begins an infinite looping sequence at step 35 until terminated by the user. During this looping sequence, the translation software opens the file currently being written at step 34b and continuously reads the hexadecimal bytes from the file, byte-by-byte, converting them to their decimal equivalent. Step 36 searches for the first instance of a heartbeat message (this provides a starting point for data processing) module. Upon finding it, then at step 47a the message identifier byte is stored and bytes are continued to be read. Once this file position is discovered, subsequent bytes are then used to populate temporary data arrays based on the current message identifier 47b. Once an array is fully populated at step 37, it is passed to a checksum function where the message integrity is validated. If the checksum fails, the message is discarded. If the checksum process passes, the array is then transferred to a series of thread functions corresponding to the current message identifier (e.g. heartbeat 38, ownship. GPS altitude, or traffic report 39) and a new thread is born. These thread functions are responsible for reading and interpreting the bytes such that useful information can be provided to the flight crew at GCS 1. While this information is being computed in the thread, the Master Serial program 30 continues to read bytes and populate other arrays. Once the Master Serial 30 has finished reading all current messages from the ADS-B, at step 45 it waits for the threads to join and return their data. This data is then placed into the proper location within a main dictionary. Within the dictionary, each aircraft is assigned its own unique location with ownship data always occupying the first index location. All aircraft are assigned their own unique International Civil Aviation Organization (ICAO) code and the dictionary is indexed by ICAO Code. The data is placed into the proper location within the main dictionary by searching until a match is found. If a match is found, the data returned from the telemetry processors will simply be appended to the matching ICAO code index. If no match is found, the data will be assigned a new position, unused within the dictionary. For the latitude, longitude, and altitude elements, the thirty most recent data points are stored (these are used to display the color-coded flight history, or "contrails" of a particular aircraft trajectory as described below). In order to provide pilots with the latest and most relevant data, each aircraft is also assigned a timeout parameter. This timeout parameter allows continuous monitoring of the age of the latest data entries and is used to delete any aircraft (hence removing it from the display) which has not received an update in at least 25 seconds. This timeout period requirement is consistent with the FAA TSO-195 standard to eliminate stale air traffic data or misleading information. After all active telemetry processing threads have joined and the data distribution process is complete, the program once again resumes and passes the updated dictionary to Keyhole Markup Language (KML) threads where the information is written in a KML format file at step 40, the KML format being supported by the display software (e.g., Google® Earth). Unlike the threads which interpret and analyze bytes, the main software does not wait for the KML threads to join and terminate since they are able to operate asynchronously from the main program. User selected overlays 46 as well as status and traffic alert overlays (to be described) are applied as necessary. Further, these files at step 40 and 41 are overwritten at every instance since they are being continuously monitored for updates by the NASA World Wind. Google® Earth Pro software.

Loss Link Functional Redundancy

In the event that radio telemetry communication is lost with the ADS-B hardware on a UAS 2, it becomes critical to acquire ADS-B data from an outside source to maintain an enhanced state of situational awareness. Although radio telemetry communications is nominally reliable loss link failure is a likelihood risk due to various factors such as simple line of sight distance, interference, and atmospheric disturbance. The software architecture uses a backup parallel design to automatically establish a connection with the FAA Technical Center and receive data via a UDP/IP Ethernet connection. To accomplish Loss Link functional Redundancy the present invention employs a redundant architecture and a lost link software module at GCS 1 for automatically arbitrating to a backup (redundant) ADS-B data stream upon loss link.

Figure 7:
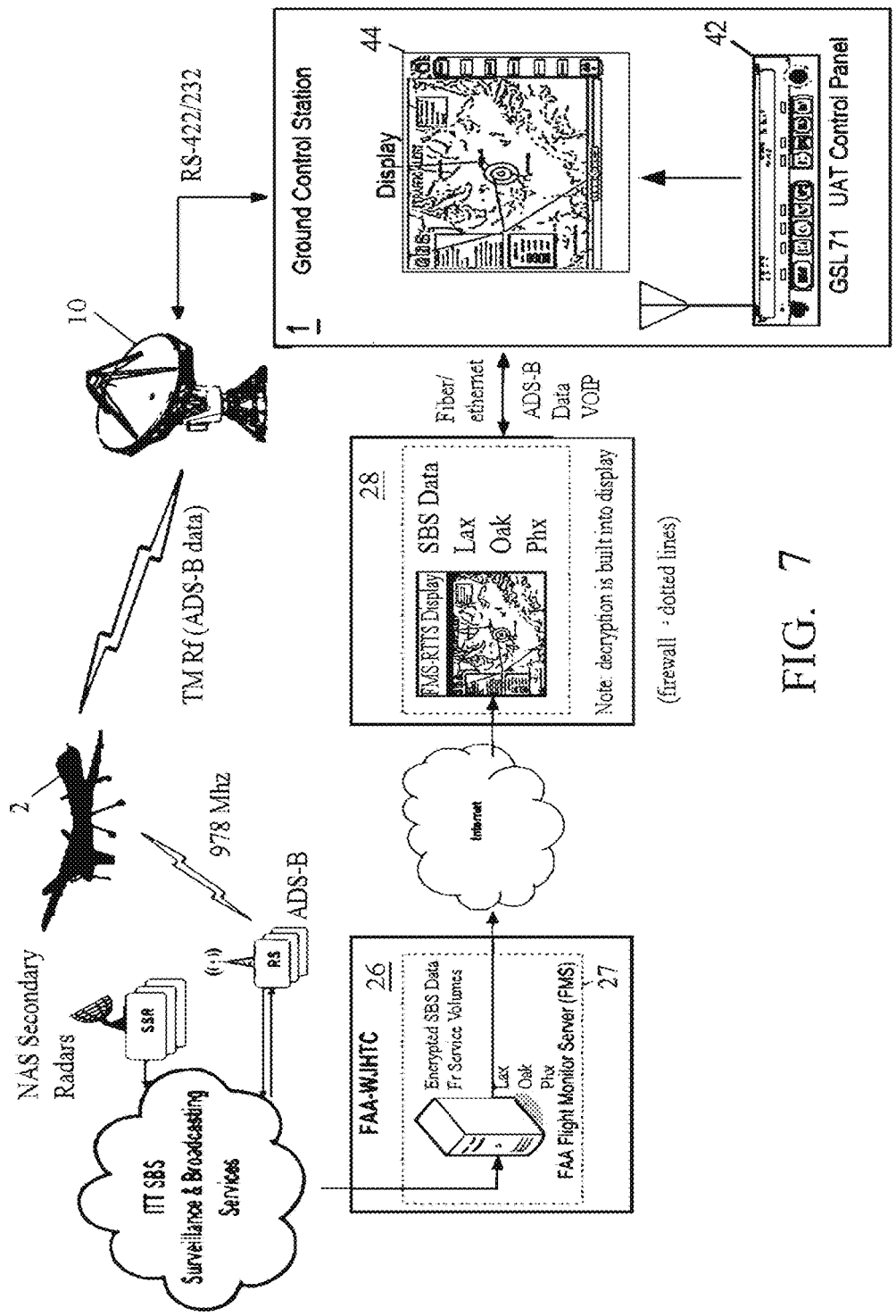
FIG. 7 is a diagram of the UAS-ADS-B functional redundancy architecture for loss link of vehicle telemetry.

FIG. 7 is a diagram of the UAS-ADS-B functional redundancy architecture for loss link of vehicle telemetry 10. With the UAS transmission of ADS-B broadcasts, ADS-B messages are received by one or more ADS-B ground based transceiver(s) within line-of-sight coverage. During a loss link scenario the lost link software module at GCS 1 automatically arbitrates to a backup (redundant) ADS-B data stream as illustrated in FIG. 7 until the vehicle telemetry ADS-B data is received and checksum values match. The backup (redundant) ADS-B data stream may be the FAA Technical Center 26, in which case each secure ADS-B data steam packet is received by the GCS 1 through a UDP/IP network link from the FAA Flight Monitor Server (FMS) 27 for UAS operator display 44. This way, whenever telemetry 10 is lost between the UAS and GCS 1, the loss link software module automatically and immediately processes the ADS-B data streamed from the FMS 27. The FAA Flight Monitor Server 27 located at the William J. Hughes Technical Center 26 multi-streams the UAS ownship (ADS-B ICAO) and/or ADS-B/ADS-R/TIS-B/FIS-B traffic situational awareness data to the FMS 28 Real Time Tracking Surveillance (RTTS) module resident on the ADS-B laptop and/or local host server. The FMS 28 RTTS module decrypts the ADS-B data multi-steam packets. The GCS 1 ADS-B laptop parses and process the data for display, so that the UAS operator is properly informed of traffic data and alerted. In another embodiment ADS-B data from a commercial ITT SBS Surveillance and Broadcasting Services using a publish/subscribe method is directly streamed to GCS 1 ADS-B laptop via a secure UDP/IP network protocol and can be used to track the UAS 2 until the primary signal can be recovered.

The FAA flight monitor server 27, located in the FAA Technical Center 26, nationally provides a network infrastructure to receive ADS-B packets, encrypts the data, and rebroadcast all data as multicast UDP packets. The FMS 27 connection allows the GCS 1 to receive live ADS-B traffic data. The SBSS/SDP network architecture utilizes a predefined transport layer port number and network layer multicast IP addresses for each application service supported. Since up-to-date flight data is highly sensitive and the established communication protocol is UDP, network data broadcasts from the FAA Technical Center 26 are encrypted for network security. The payload ADS-B report packets are formatted and encoded by the FAA Category 033 (v3) format message structures defined in FAA NAS-IC82530001-01 Appendix B. The FMS-RTTS client/server 28 application by the FAA, which is hosted on a Laptop or Gateway server as an MS window based client, is able to decrypt and receive packets in the FAA's CAT 33 format. In the preferred embodiment the FMS RTTS client/server 28 application is hosted directly on the ADS-B Laptop 44, thus ADS-B data streams can be received directly.

Referring to the loss-link (left-hand) side of FIG. 6, if the loss link module detects a loss link scenario the lost link software module begins an infinite looping sequence at step 43 until terminated by the user. During this looping sequence, the loss-link software automatically arbitrates to a backup (redundant) ADS-B data stream available over the UDP/IP port, reads it at step 44a, and writes all incoming backup data to a file in hexadecimal format at step 44(b), the backup data essentially becoming the surrogate for the translation software above beginning at step 36. In the presently preferred embodiment, when the loss link module has detected a failure condition at step 42, the software utilizes the JAVA "Socket" module to connect to the multicast IP address and associated port at step 44 wherein data will be received and written in the same manner as the serial connection in the main architecture 31. Once connected, the socket behaves essentially like a file that can be read as at step 44. The service volume IDs (IP addresses encoded in the form of 239.16x.yz.31) are known apriori. For illustration, the transport layer assigned port may be designated as 59950 and the multicast IP address is 239.161.yz.31 (i.e. LAX 26 SV). The LAX ADS-B UAT CAT 33 data stream will be routed from the ADS-B FMS 27 server via multicast IP to the FMS RTTS client/server 28 application, wherein the ADS-B data packets are decrypted on a gateway local host server network address (10.10.10.10) and then sent to the ADS-B Laptop 44 UDP/IP (10.10.10.xx) Ethernet port connection. The ADS-B Laptop IP network address herein (10.10.10.xx) cannot be 0, 10, or 255. The software searches for the unique ICAO code of the said UAS 2 in the ADS-B data-stream, if a key match is found the matching element (target address) has been found so its index, or position, velocity, altitude and service volume ID is parsed, the data returned will be appended to the matching ICAO code index, and processed for display. If radio telemetry communication is somehow recovered with the UAT 3 on the UAS 2, the lost link software module automatically switches back to the nominal UAS transmission of ADS-B messages via vehicle telemetry. This method provides UAS-ADS-B functional redundancy for increased situational awareness, a critical attribute for safe UAS flight operations.

Loss Link Module

Figure 8:
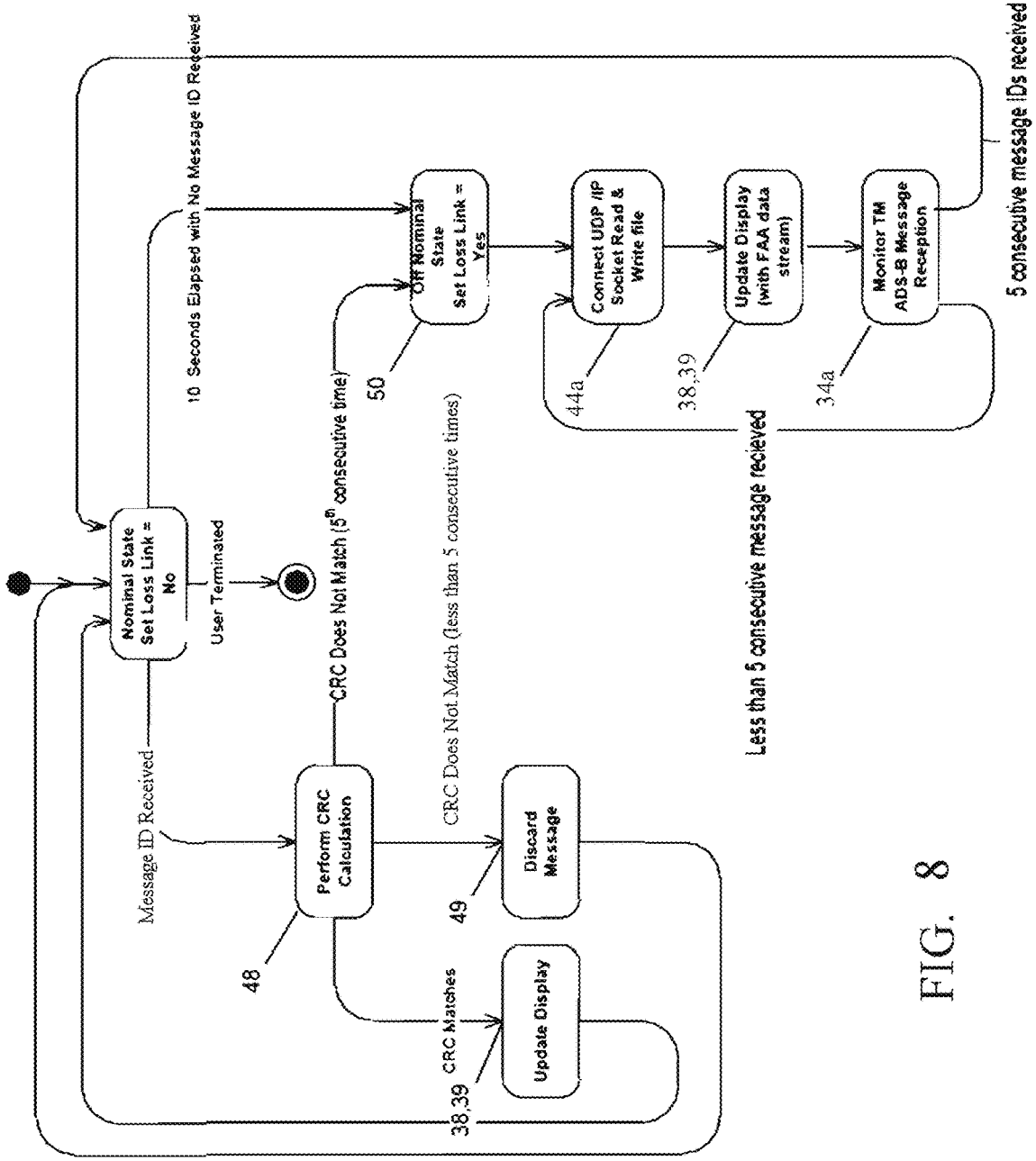
FIG. 8 illustrates the detailed Loss Link module state machine diagram for the loss link checksum algorithm 42.

FIG. 8 illustrates the detailed Loss Link Module state machine diagram used at GCS 1 ADS-B laptop according to the present invention. In accordance with the invention, the reception of consecutive corrupted or no ADS-B messages are considered a loss link failure (off-nominal) condition. When consolidated ADSB Out and ADS-B In data is sent over the RF telemetry link(s) to the ADS-B Laptop 44 at GCS 1, it is possible that external environmental factors will result in data corruption. In accordance with the invention the consolidated ADS-B Out and ADS-B In message packets are each encoded with checksum bits to ensure the integrity and validity (99.9% accuracy) of the ADS-B messages prior to transmission to the ADS-B Laptop 44 at GCS 1. A conventional CRC binary checksum value is computed and appended to the end of each ADS-B Out and ADS-B In message, the checksum being the result of a binary long-division calculation computed from the message block of digital data. As the ADS-B message is received, a lost-link software module resident on ADS-B Laptop 44 re-calculates the checksum value from the message and compares it to the appended checksum value 48. If the calculated checksum value matches the appended checksum value, the data is assumed correct for display 39. If not, the entire message packet is discarded 49. If the checksum does not match for a least five consecutive times and/or no message IDs are received, the Loss Link state machine transitions to the off nominal state 50 and loss link 42 is enabled to true. Basically, the lost-link module determines when the radio telemetry communications has failed and automatically arbitrates to a backup (redundant) data stream 44 as illustrated in FIG. 6-7, thereby providing redundancy for the ADS-B data.

Self-Separation Assurance and Collision Avoidance Software Module

Figure 9:
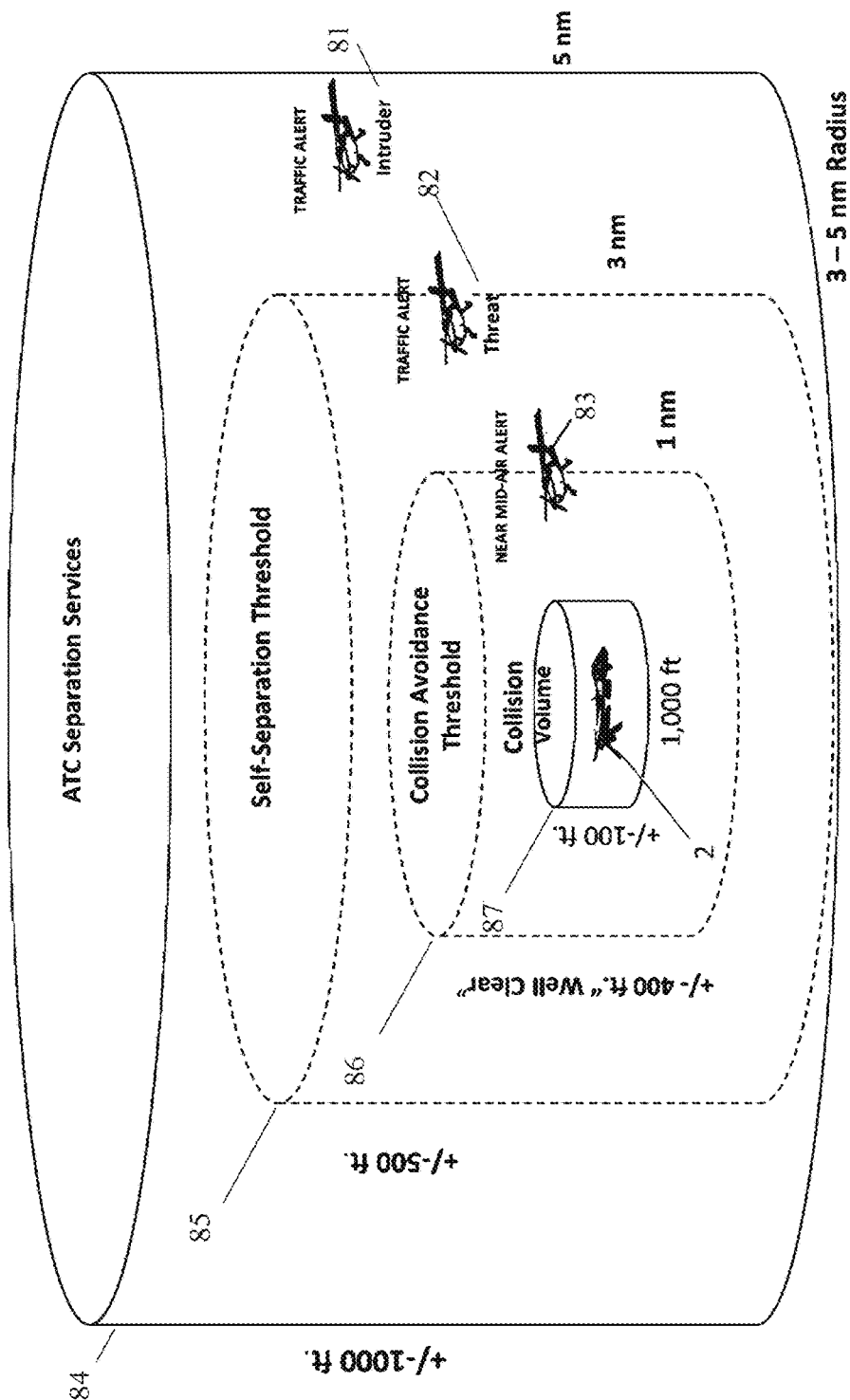
FIG. 9 is a more detailed illustration of the UAS-ADS-B risk collision volumes 84-87 for detecting intruding aircraft, alerting, and displaying UAS 2 aircraft position for self-separation assurance.

FIG. 9 is a more detailed illustration of the UAS-ADS-B risk collision volumes 84-87 for detecting intruding aircraft, alerting, and displaying UAS 2 aircraft position for self-separation assurance. The software is generally designed to detect intruding aircraft in terms of increasing threat risk and to display aircraft position. The objective of the self-separation assurance software module is to detect and alert UAS pilots of potential collisions or hazardous traffic situations. As shown in FIG. 9 UAS-ADS-B risk collision volumes are used to establish increasing threat risk. Traffic alerts are based on separation and collision zones 84, 85, 86 & 87 surrounding the UAS 2, respectively. The self-separation assurance software module establishes a plurality of geometric and concentric collision zones 84, 85 . . . n about the moving UAS 2, each representing the actual position of the UAS 2 within a region of interest. The regions of interest are pre-determined to allow self-separation via direct control by the UAS pilot, e.g., to allow the UAS 2 to be maneuvered within a sufficient timeframe to prevent activation of a collision avoidance maneuver while conforming to accepted air traffic separation standards. The collision zones 84-85, 86 . . . n are preferably cylindrical volumes, but may be spherical or ovoid. The outermost collision zone 84 establishes a 5 nautical mile (NM) separation threshold about the UAS 2 and if another aircraft/object breaches zone 84 a coded (yellow) aircraft symbol 81, traffic alert, and aural alert is automatically generated. The next collision zone 85 establishes a 3 NM safety radius (minimum separation) about the UAS 2 and if another aircraft/object breaches zone 85 a coded (red) aircraft symbol 82, traffic alert, and aural alert is automatically generated. The next collision zone 86 establishes a 1 NM collision avoidance threshold about the aircraft and if another aircraft/object breaches zone 86 a coded (red) aircraft symbol 83, a near mid-air collision alert, and aural alert is automatically generated. The innermost collision zone 87 establishes a 1000' diameter about the aircraft and if another aircraft/object breaches zone 87 a collision-imminent signal and aural alert is automatically generated. These auto-generated traffic alerts based on separation and collision zones 84-87 surrounding the aircraft are consistent with the recommendations of RTCA Special Committee 186: "Application of Airborne Conflict Management: Detection, Prevention, & Resolution." RTCA/DO-263, December 2000. Thus, safe separation ("well clear") for the purpose of algorithm simulations and flights tests is defined in FIG. 9 above 400 feet vertical separation or greater than 1.0 NM horizontal separation and these parameters can be modified to FAA SC-228 standards when published.

Figure 10:
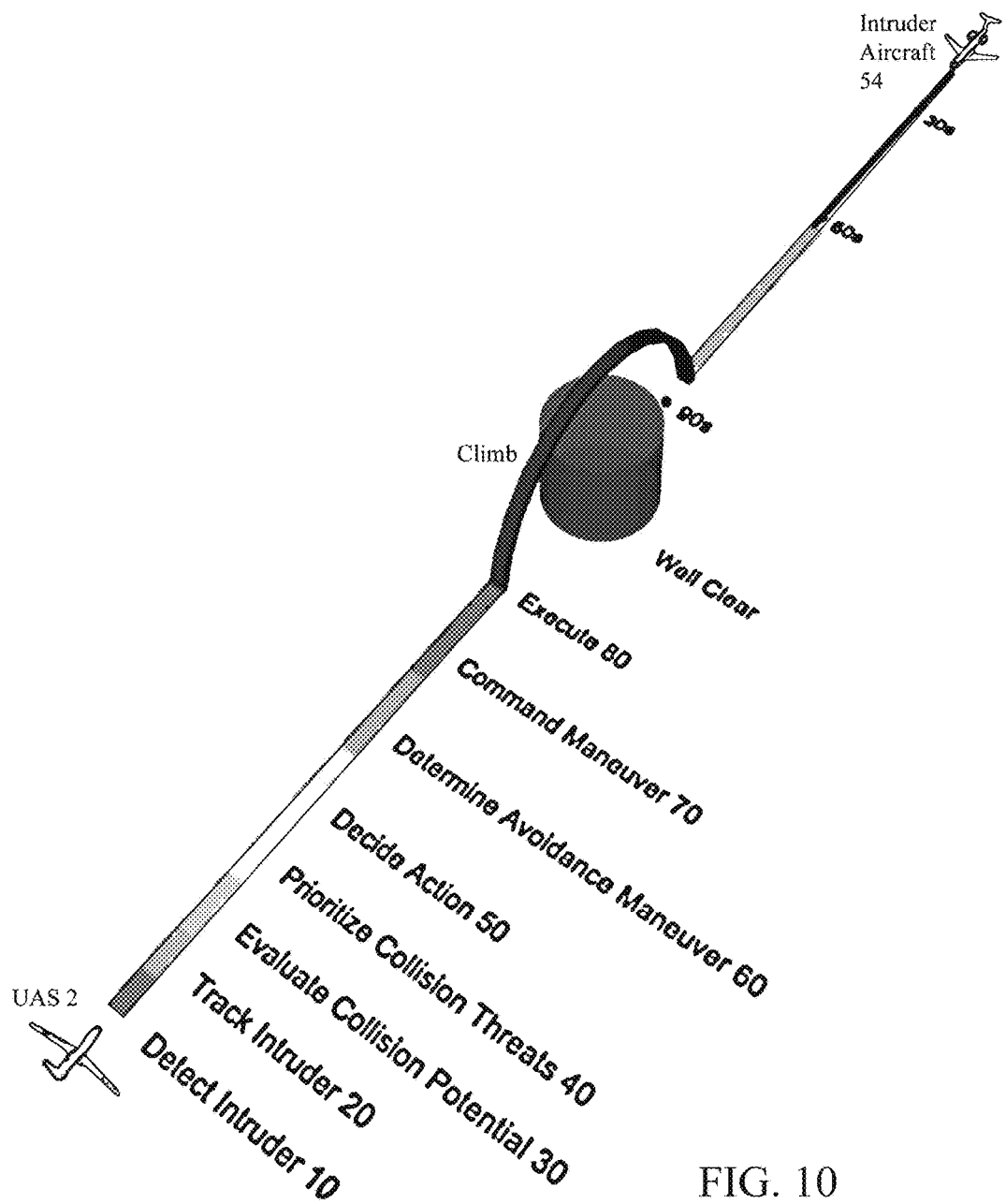
FIG. 10 is a state diagram of the self-separation and collision avoidance software process

FIG. 10 is a state diagram of the self-separation assurance and collision avoidance software process based on geometric collision zones 84, 85 . . . n. The UAT 3 transmits ADS-B out ownship messages, followed by ADS-B In traffic message reports, then radar target data, allowing GCS 1 and/or ASAP 45 to establish the above-described risk-collisions volumes with other surrounding priority aircraft (as per FIG. 3). The radar data is updated at a rate of 10 Hz or more and is arbitrated with the ADS-B. Specifically, the radar targets are converted by the ASAP 45 from Doppler, range, azimuth and elevation to a similar ADS-B state format as described above (latitude, longitude, altitude, ground speed), UTC timed tag, and tracked as unique R01, R02, and R03 intruder targets, respectively using red symbology. If the ASAP 45 determines a near mid-air alert (per FIG. 9, less than 400 feet vertical separation or less than 1.0 NM horizontal separation), the radar is prioritized over ADS-B for the detection and tracking within this emergency collision avoidance threshold volume. In addition to radar prioritization, the execution steps 10 thru 80 are performed by ASAP 45 at a much higher frequency (allowing a shorter sequential timeline) starting at the collision avoidance threshold of FIG. 9. The collision avoidance algorithm uses the collision volume defined in FIG. 9 as the keep out zone. It should be noted that a LIDAR sensor can be used in conjunction with the radar and the implementation is not limited to the radar sensor.

At step 10, GCS 1 and/or ASAP 45 detects and tracks nearby aircraft from the ADS-B position reports. GCS 1 and/or ASAP 45 may filter state vector information using an exponentially weighted average (EWA) filter.

At step 20, GCS 1 and/or ASAP 45 tracks or estimates the position and velocity (state) of intruders based on one or more surveillance reports.

At step 30, GCS 1 and/or ASAP 45 evaluates collision potential.

At step 40, GCS 1 and/or ASAP 45 prioritizes potential collision threats.

At step 50, GCS 1 and/or ASAP 45 declares when a collision is imminent.

At step 60, GCS 1 and/or ASAP 45 determines an appropriate avoidance maneuver.

Specifically, GCS 1 computes potential avoidance maneuvers using a Strategic Conflict Resolution (Stratway) library. The Stratway library is being developed by NASA and is available as open source code. Stratway provides conflict detection and resolution algorithms using kinematic aircraft trajectories. Given a flight plan described by a sequence of 4D waypoints (aircraft position and time), Stratway is capable of comparing other flight plans, detecting conflicts, and generating a modified four-dimensional (latitude, longitude, altitude, and time) flight plan to ensure a conflict-free trajectory. Stratway is available in both Java and C++ software libraries. The Stratway maneuver library used to define an autonomous maneuver are:

1. Change course to left or right—algorithm calculates minimum turn required to resolve the conflict; and when "well clear", changes heading to return to original flight path.
2. Climb or descend—a vertical maneuver to establish safe separation.
3. Alter climb/descend rate if appropriate to establish safe separation.
4. Speed up/slow down—maintain heading, but cross in front of conflict, or allow conflicting aircraft to pass in front of ownship.

At step 70, GCS 1 the UAS operater manually flys or the ASAP 45 sends the Stratway command (resolution advisory) to the autopilot 80 to execute the maneuver.

At step 80, the autopilot 80, when enabled, executes the maneuver.

Synthetic Display and Alerting

As stated above, the present invention provides various intuitive 3D/4D synthetic views of the UAS and its surroundings as well as projected future positions of the UAS and other aircraft. The design of this synthetic display user interface can be seen in FIG. 11-15.

FIGS. 11-15 illustrate the UAS-ADS-B synthetic display for exocentric (God's eye) and egocentric views and related functionality showing user controls and three dimensional display processing. The pilot may select from a plurality of viewpoints including God's Eye (FIGS. 11-12), Chase (FIG. 13), and Manual views (FIG. 14) for the out-the-window view. The synthetic displays collectively keep the pilot aware of what the UAS 2 is going to do during flight.

Figure 11:
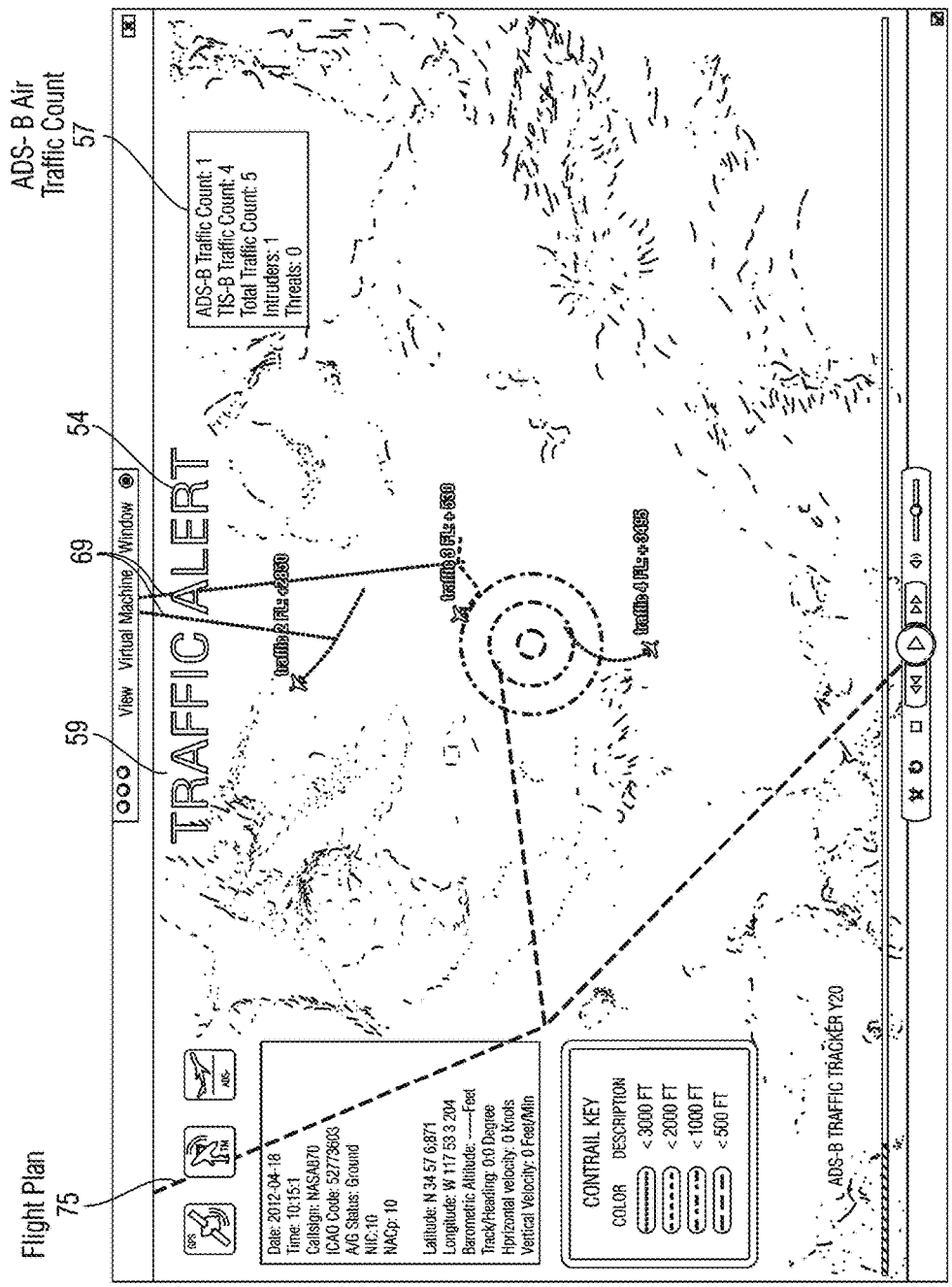
FIGS. 11-15 illustrate the UAS-ADS-B synthetic display for exocentric (God's eye) and egocentric views and related functionality showing user controls and three dimensional display processing.
Figure 12:
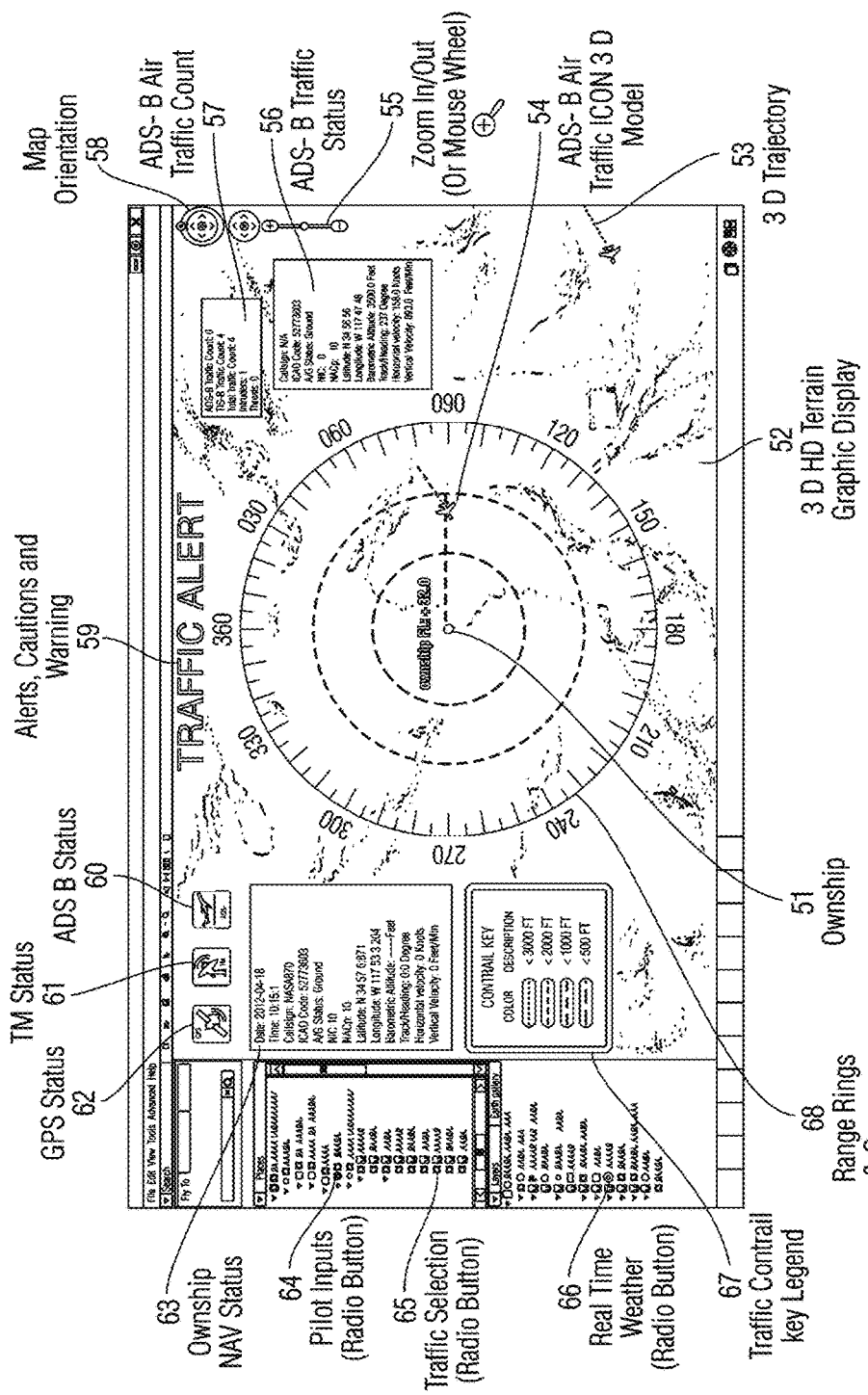

As seen in FIGS. 11-12, a key aspect of the visual display is that all traffic aircraft models are accompanied with three-dimensional color-coded contrails to aide in the visual acquisition of traffic targets. Traffic contrails 69 are color-coded based on the relative altitude vertical separation distance between the object and the ownship. The 3-dimensional graphical representation of traffic models uses a plurality of airborne and/or surface vehicles; which are based on ADS-B aircraft identification and/or vehicle emitter types. The exocentric view or God's Eye viewpoints of FIGS. 11-12 display ADS-B traffic on a plan view relative to own-ship, allowing the pilot to effectively gauge the traffic surrounding the ownship. This is well-suited for situational awareness.

ADS-B Status and Alerts

The ideal design incorporates salient indicators and unique display views to maintain the operator's situational awareness. The number of both intruders and threats is closely monitored and displayed to the pilot in an overlay located at the upper-right portion of the screen 57. In order to alert users of system anomalies, the software also displays notifications pertaining to the status of the hardware. The salient indicators GPS Status 62, ADSB status 60, and Telemetry Status 61 indicate the following failure conditions:

GPS Invalid
GPS Failure
UAT Failure
Lost Link

The GPS status 62 is continuously monitored by analyzing the status byte located within each heartbeat message. A "GPS Invalid" overlay will first be displayed when the UAT 3 indicates that GPS data is invalid. The GPS icon in the display will also change from green to yellow during this time. Once the invalid status has been maintained for ten consecutive heartbeat messages, the "GPS Invalid" overlay is replaced by "GPS Fail" and (Red X screen) overlay. The GPS status icon also converts from yellow to red. If the status byte indicates valid GPS data at any time, the GPS overlays are removed and the status icon reverts to green, indicating a nominal state.

The ADS-B status 60 is also continuously monitored, a UAT Failure occurs if the UAT bit failure indication or if all communication with the ADS-B unit is lost for 10 consecutive seconds. This event can be attributed to a total hardware failure anywhere in the system. Once this condition is recognized, a "UAT Fail" overlay is displayed and the ADS-B icon 60 becomes red. Finally, the Lost Link status alert 61 is continuously monitored by the loss link module by analyzing invalid checksum operations. Corrupted ADS-B data or no data herein is considered a malfunction and the telemetry icon 61 becomes red. The Radar Icon operates in a similar way.

Examining FIG. 11, an operating display in Manual View, it can be seen that there are currently a total of three real-time aircraft being tracked flying within the viewing limits. The position history is stored and displayed via color coded contrails. The target labeled "traffic 3" 54 has breached the 5 nautical mile separation threshold (outermost range ring) and is within 1000 feet of altitude causing a "Traffic Alert" 59 overlay to be displayed to the user. On the left of the display, all relevant ownship information 63 is visible with hardware status indicators located directly above. The current flight plan is also displayed 75. Further, the image overlay 57 in the upper right corner currently recognizes three TIS-B targets, one ADS-B target, and one intruder 54. In the manual view modality, the field of view limits can be manipulated to a worldwide view or to any user spatially oriented viewpoint. The ADS-B laptop display 44 herein is utilized for visual and/or aural display to the flight crew as well as for performing routine maintenance of the ADS-B system.

Figure 13:
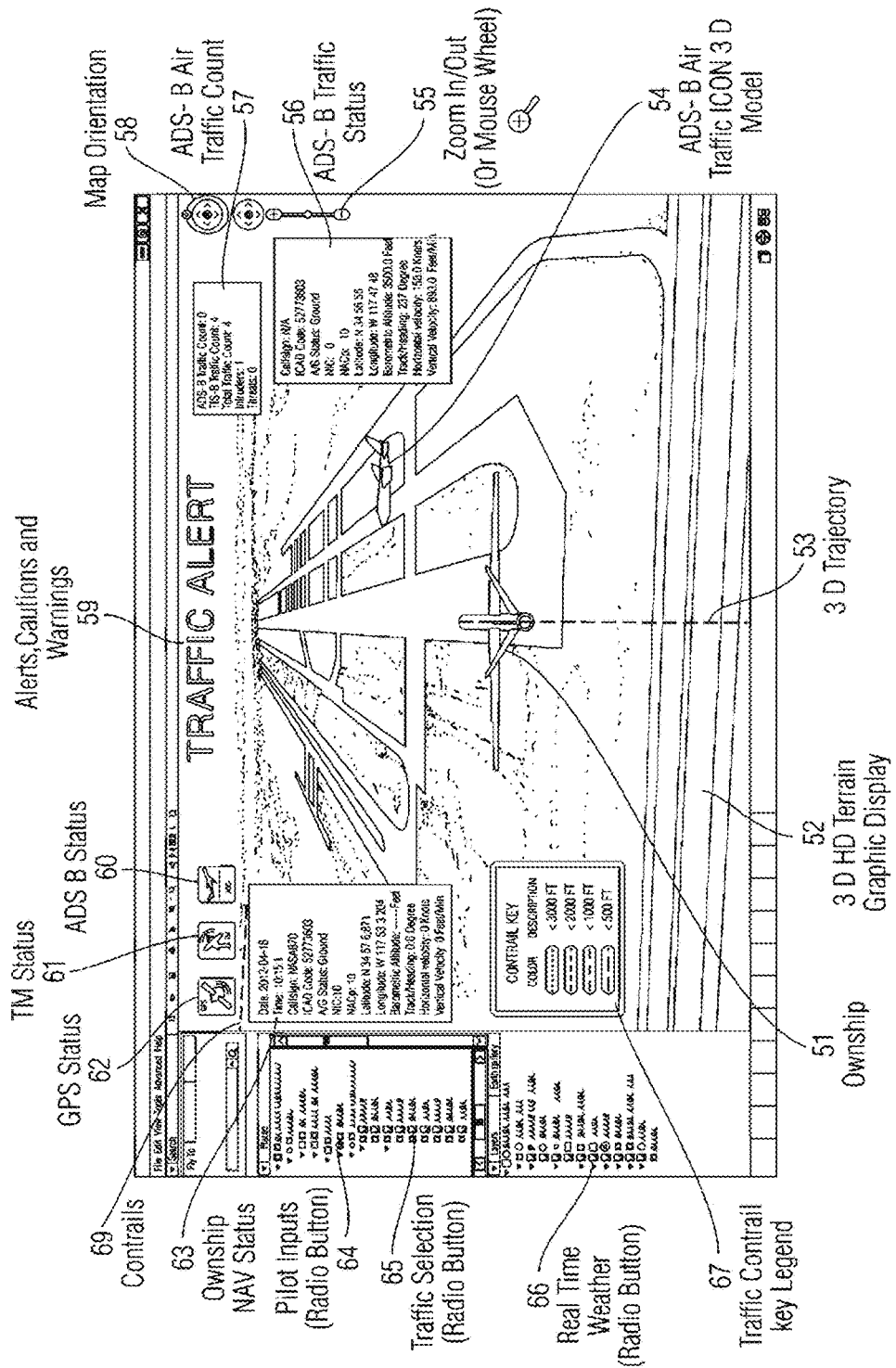

FIGS. 12-13 illustrate the UAS-ADS-B synthetic visuals for exocentric (God's eye) and egocentric views and related functionality showing user controls and three dimensional display processing. The ideal solution is to design the system in a way that keeps the pilot aware of what the aircraft is going to do during flight. The design implementation, for that reason, allows the user to select a plurality of viewpoints from God's Eye, Chase, and Manual views for the out-the-window view 64. In addition, three concentric circles are drawn around the ownship; one at a radius of 10 nautical miles (magnetic compass), 5 nautical miles, and at 3 nautical miles 68. This allows the operator to approximate the self-separation between the ownship and traffic. Finally, located at the far left 64 of the figure, it can be observed that the pilot has several viewing options as well as the capability of either enabling or disabling any of the programs features such as real-time weather, ADS-B ground stations, and satellite imagery. Geobrowser network links are used to link to a plurality of near real-time satellite information from the FAA, DOD, and NOAA to overlay satellite imagery.

Traffic for a plurality of targets can be selected at the far left 65 with the highest priority traffic ranked order from 1 to 32 relative to ownship. The selected traffic target displays the ADS-B surveillance information including ICAO, NIC, and NACp 56. Further, the traffic relative bearing, range, altitude, and vertical trend 54 are depicted to aid in visual acquisition. Finally, to improve pilot situational awareness, the surveillance information from nearby aircraft is continuously monitored and compared to the current ownship position. If any other aircraft's (e.g., 54) relative horizontal separation distance falls below 5 NM and reports vertical separation within 1000 feet of the current ownship position, the target is deemed an intruder and the pilot is alerted via a "Traffic Alert" overlay 59. In this case the target's icon 54 changes color from blue to yellow on the display. In the event that the horizontal separation is less than 3 NM and the target reports an altitude within 500 feet, the target 54 becomes a threat and the pilot is notified via a flashing "Traffic Alert" overlay 59 and aural alert as well as a change of icon color from yellow to red. The traffic symbols for TIS-B are depicted as Icon based standard symbols from RTCA/DO-317A.

FIG. 13 is an egocentric "Chase" viewpoint, which attempts to give the pilot an intuitive 3-D visualization of the flight of the ownship. This lags the ownship and allows the pilot to see the entire UAS 2, along with all traffic in the forward vicinity. This perspective viewpoint can be spatially oriented to a cockpit out-the-window view.

Figure 14:
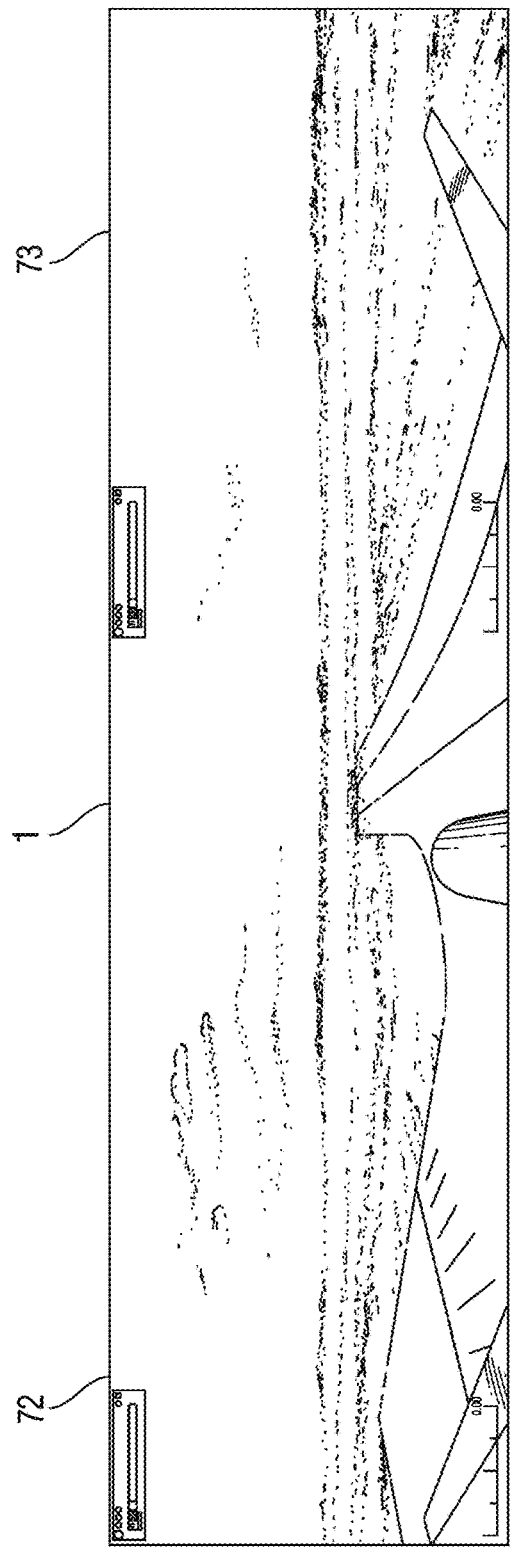

FIG. 14 is a manual or out-the-window view providing a panoramic display functionality using at least three cockpit displays.

Figure 15:
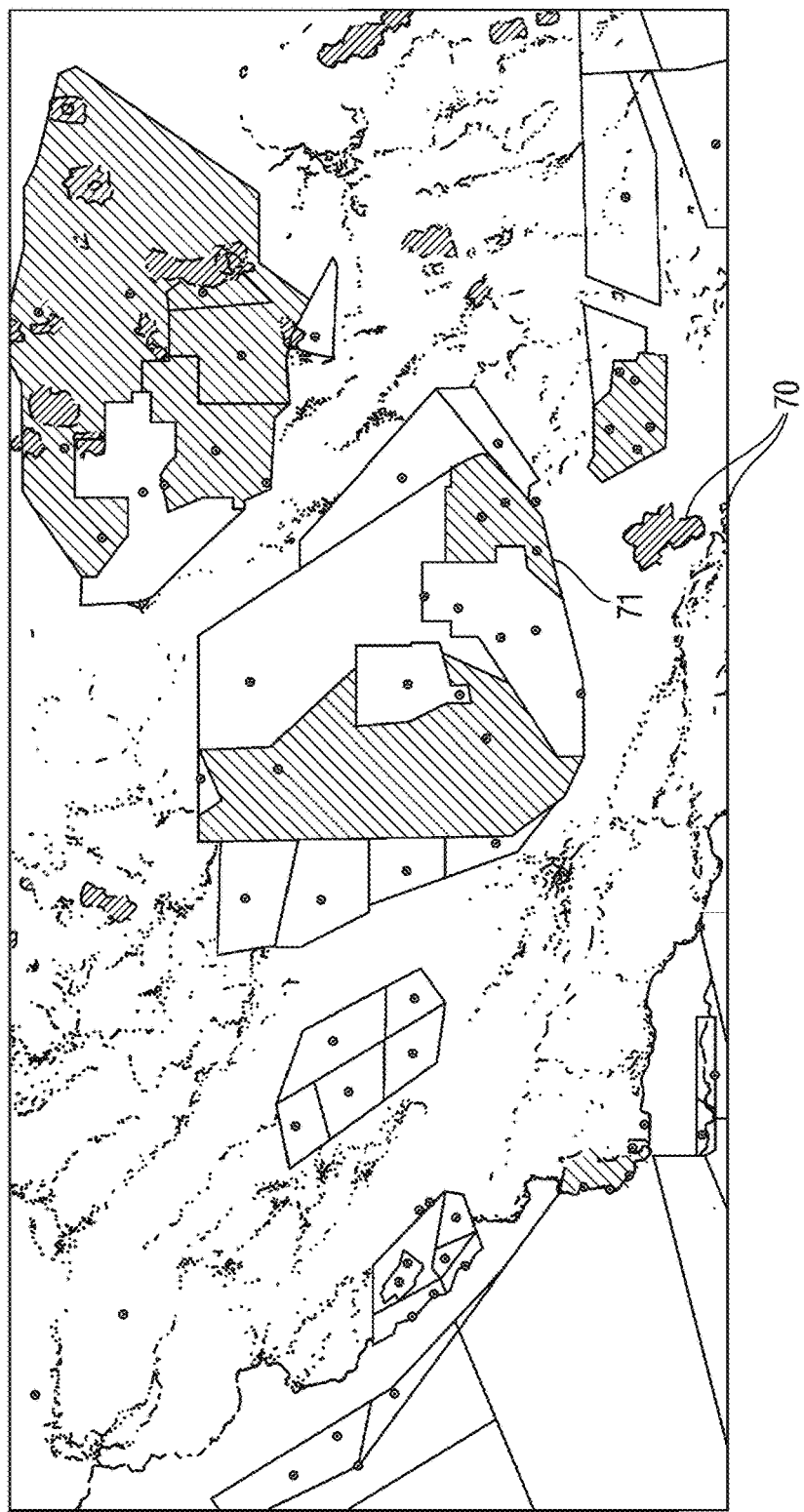
Figure 16A:
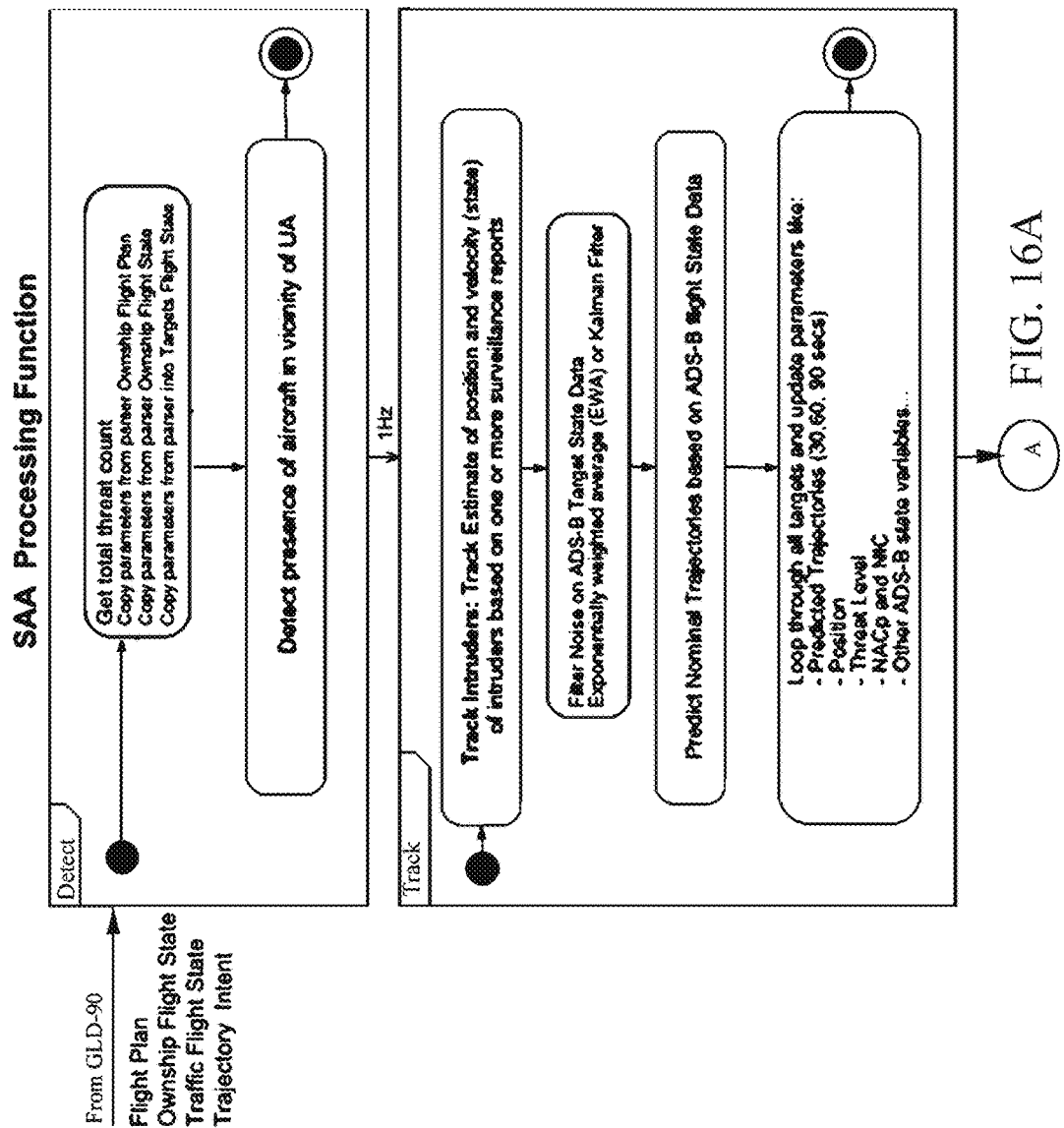
FIGS. 16A-16D are a sequence of more detailed block diagrams of the self-separation and collision avoidance software process.
Figure 16B:
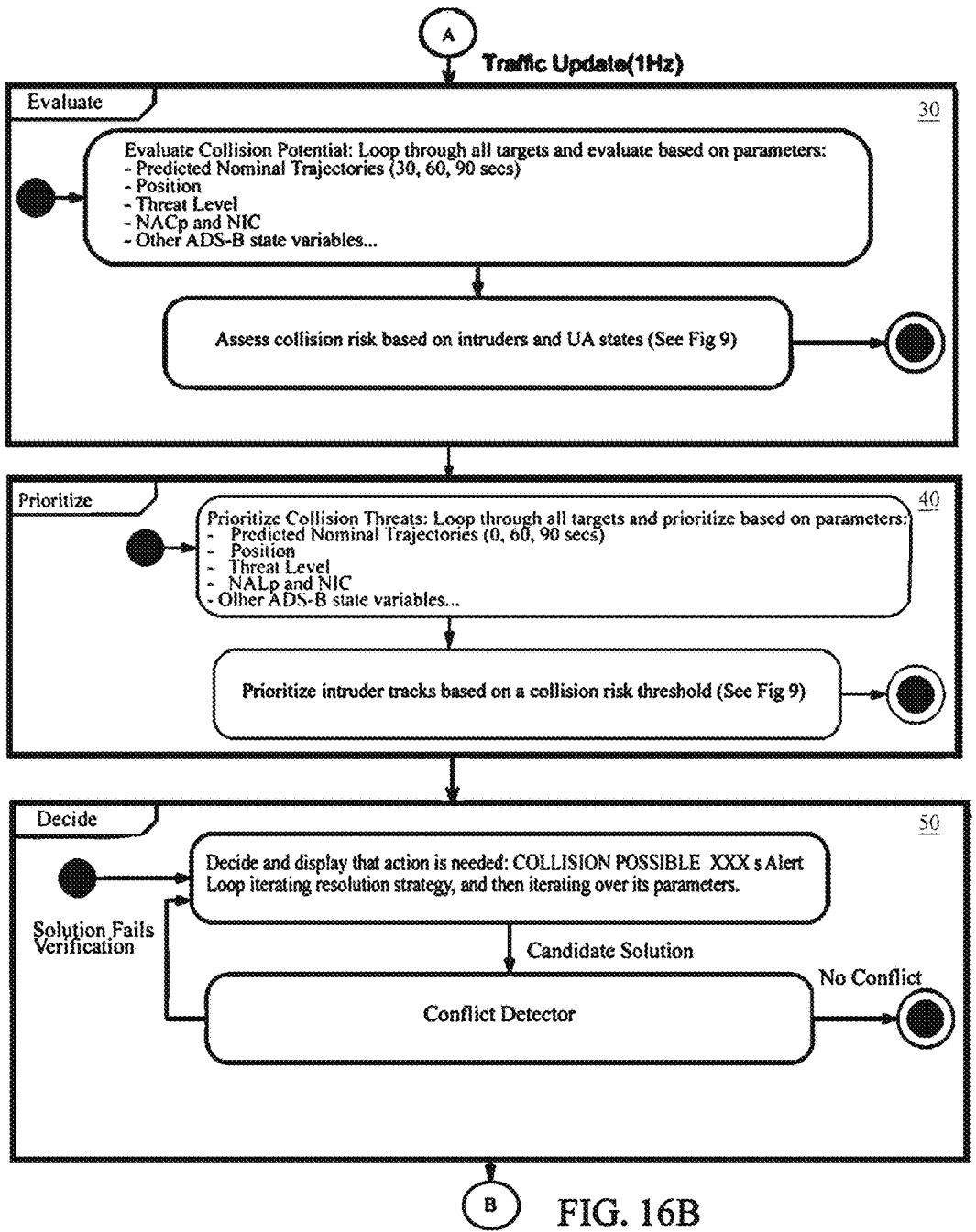
Figure 16C:
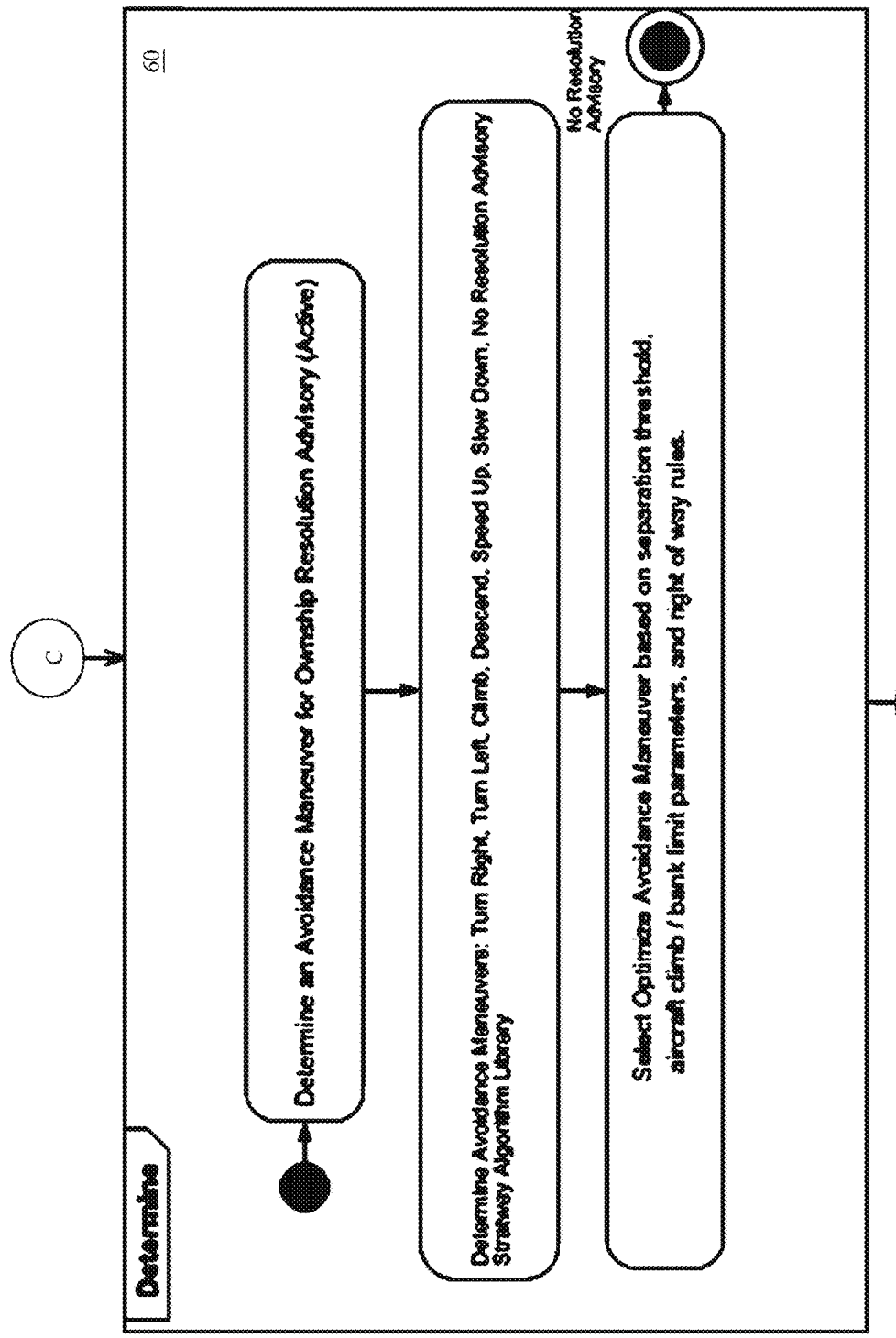
Figure 16D:
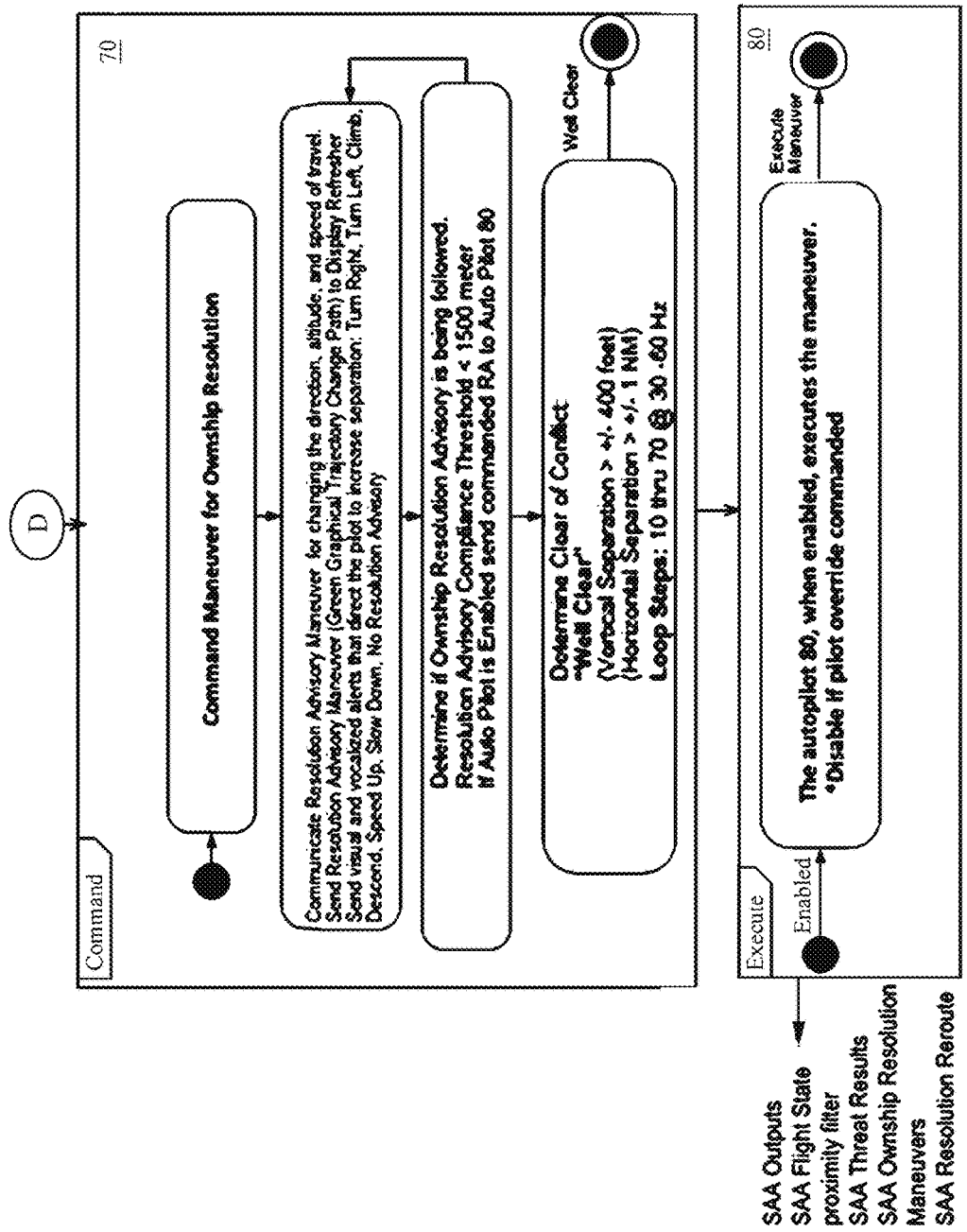

FIG. 15 illustrates the UAS-ADS-B visualization from the God's Eye view including overlays for weather 70, restricted airspace 71, and ADS-B ground stations. By including network links to the FAA database, the display incorporates FAA airspace designations, ADS-B ground stations, satellite imagery, and real-time weather 70, all of which are effectively seen when the user is in God's Eye View.

FIG. 16 is a detailed sequence diagram of the self-separation and collision avoidance (e.g., sense and avoid (SAA)) processing of steps 10 thru 80 of FIG. 10. It should be noted that the ADS-B targets are updated at 1 Hz and radar targets are updated at 10 Hz. However, the SAA processing function is updating at 30 to 60 Hz iterations for real-time self-separation assurance and collision avoidance (as per FIG. 10). It should be noted that SAA processing function is continually executing even when a resolution advisory has been issued in order to protect ownship against new multiple intruder threats or changing dynamic conditions.

At step 10, GCS 1 and/or ASAP 45 detects and tracks nearby aircraft from the ADS-B position reports. From UAT 3 (e.g., Garmin's ADS-B capable GDL 90 installed in the forward avionics bay depicted in FIG. 4), the GCS 1 and/or ASAP 45 copy certain parameters from the Ownship Flight Plan, Ownship Flight State, Traffic Flight State, and Trajectory Intent. Based on this the GCS 1 and/or ASAP 45 detects the presence or aircraft in the area. At step 20, GCS 1 and/or ASAP 45 tracks or estimates the position and velocity (state) of intruders based on one or more surveillance reports. To do this the GCS 1 and/or ASAP 45 must filter noise on ADS-B Target State Data. This may be done using an exponentially weighted average (EWA) or a Kalman Filter. The GCS 1/ASAP 45 then predicts nominal trajectories based on the ADS-B flight state data, including Target Flight State and Target Trajectory. The GCS 1/ASAP 45 continually loops through and updates parameters such as:

Predicted Trajectories (30, 60, 90 secs);
Position;
Threat Level;
GPS Accuracy & Integrity Parameters: NACp, NIC, and SIL; and
other ADS-B state variables.

At step 30, GCS 1 and/or ASAP 45 evaluates collision potential by looping through all targets and evaluating based on the foregoing parameters:

Predicted Nominal Trajectories (30.60, 90 secs)
Position
Threat Level
GPS Accuracy & Integrity Parameters: NACp, NIC, and SIL; and
Other ADS-B state variables.

Then, an assessment is made of the collision risk based on the collision volumes of FIG. 9 and ownship states. The assessment of step 30 becomes the basis for an automated decision in step 40.

At step 40, GCS 1 and/or ASAP 45 prioritizes potential collision threats. Each potential collision threat is sent to the conflict resolution algorithm resident in ASAP 45. At step 50, GCS 1 and/or ASAP 45 declares when a collision is imminent, by issuing an Ownship Resolution Advisory (active).At step 60, GCS 1 and/or ASAP 45 determines an appropriate avoidance maneuver for the active Ownship Resolution Advisory. Potential maneuvers are: turn right; turn left; climb, descend, speed up, slow down, no resolution advisory, and other maneuvers stored in an avoidance maneuver library. The GCS 1 and/or ASAP 45 selects an optimum avoidance maneuver based on separation threshold, aircraft operational limits for climb and bank parameters, and right of way rules. Specifically, GCS 1 and/or ASAP 45 computes potential avoidance maneuvers using a Strategic Conflict Resolution (Stratway) library. The Stratway maneuver library used to define an autonomous maneuver are:

1. Change course to left or right—algorithm calculates minimum turn required to resolve the conflict; and when "well clear", changes heading to return to original flight path.

2. Climb or descend—a vertical maneuver to establish safe separation.

3. Alter climb/descend rate if appropriate to establish safe separation.

4. Speed up/slow down—maintain heading, but cross in front of conflict, or allow conflicting aircraft to pass in front of ownship.

At step 70, GCS 1 the UAS operater manually flys or the ASAP 45 sends the Stratway command (resolution advisory) to the autopilot 80 to execute the maneuver. If the latter, the GCS 1 will communicate commanded Resolution Advisory Maneuver for changing the direction, altitude, and speed of travel. The Resolution Advisory Maneuver (see path 91 in FIG. 17) is sent by visual and vocal alerts that direct the plot to increase separation. Step 70 propagates through a continuous feedback loop to ensure that the ownship Resolution Advisory Maneuver is being followed.

At step 80, the autopilot 80, when enabled, executes the maneuver.

Figure 17:
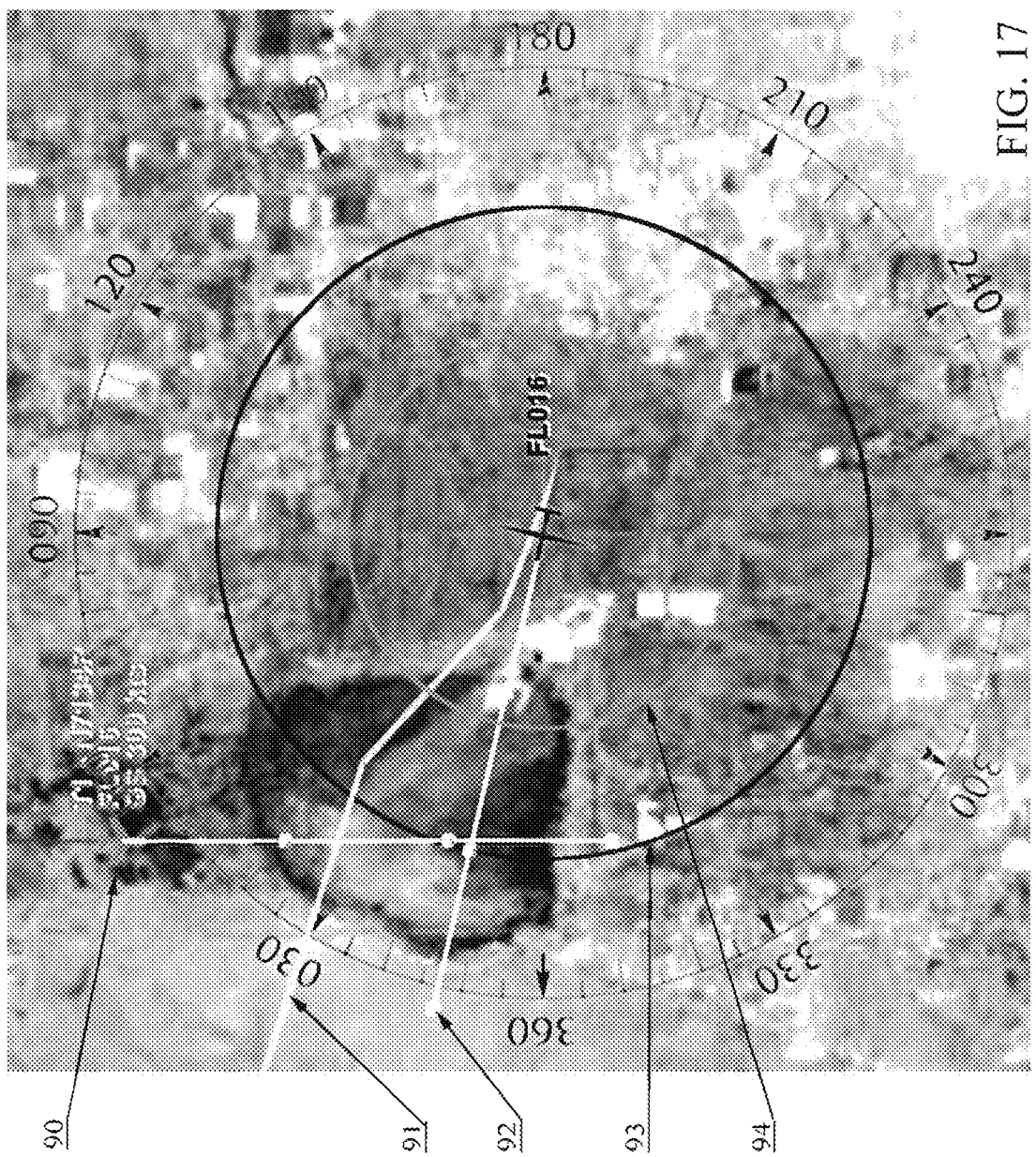
FIG. 17 illustrates the real-time software display for self-separation and collision avoidance.

FIG. 17 illustrates the UAS-ADS-B synthetic display for self-separation and collision avoidance during real-time execution of steps 10 thru 70 (above), with the graphical display of UAS ownship 2, target intruder aircraft 90, ownship resolution advisory 91 (change path trajectory) and aircraft's nominal trajectory 92 and traffic alert 93 and threat advisory 94 concentric circles.

Flight Test Results

The above-described system has been deployed and tested on an Ikhana™ Predator-B UAS using Garmin's ADS-B capable GDL 90 installed in the forward avionics bay (depicted in FIG. 4). For flight testing all RF transmission to the GCS 1 took place over the GPI/MMI 7 link. The FAA ADS-B streaming data was received as backup. The Ikhana™ Predator-B UAS underwent four highly successful flights as the first high performance large UAS integrated with ADS-B Out and ADS-B In functionality. The FAA monitored all flights and collected data for post-flight analysis. After viewing the results, it was found that the system performed exceptionally well, producing errors (5.7 feet) far below the mandated requirements.

Figure 18:
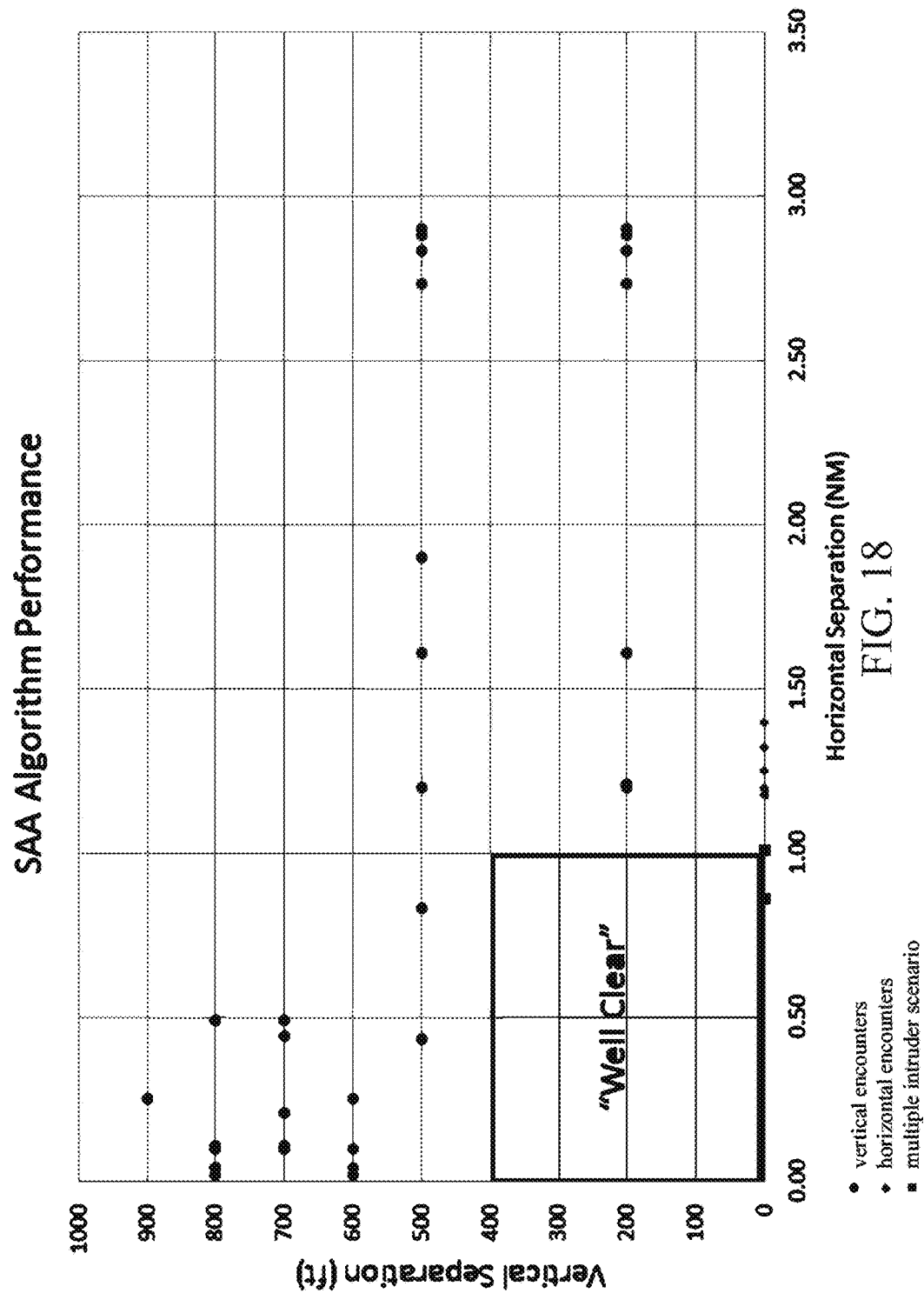
FIG. 18 illustrates the computational efficiency and the performance of the software SAA algorithm.

FIG. 18 illustrates the computational efficiency and the performance of the self-separation and collision avoidance (SAA) software processing of steps 10 thru 80 based on forty four simulation runs for self-separation and collision avoidance. Vertical self-separation of the ownship is shown as a function of horizontal self-separation. A series of simulations were conducted to assess the performance of the software SAA for encounter geometries with one or two aircraft on a direct collision course using methodology and metrics to quantify the results. All of the results from the SAA verification of the vertical, horizontal, and multiple intruder encounter geometries were flown by directly following the ownship resolution advisories and the extensive majority maintained "well clear" as depicted in FIG. 18.

This description of the present invention has been presented for purposes of illustration and description and is not intended to be exhaustive or limited to the invention in the form disclosed. Many modifications and variations will be apparent to those of ordinary skill in the art. For example, in another preferred embodiment, the UAS 2 can be outfitted with a dual link ADS-B device that transmits on 1090 Mhz and receives on both 1090 and 978 MHz.

In yet another embodiment, the components of the UAS 2 may be deployed in a surface vehicle. For example, an emergency response unit and/or and gas truck can be outfitted with portable ADS-B devices and portable UAT and GPS antennas as described above.

Figure 19:
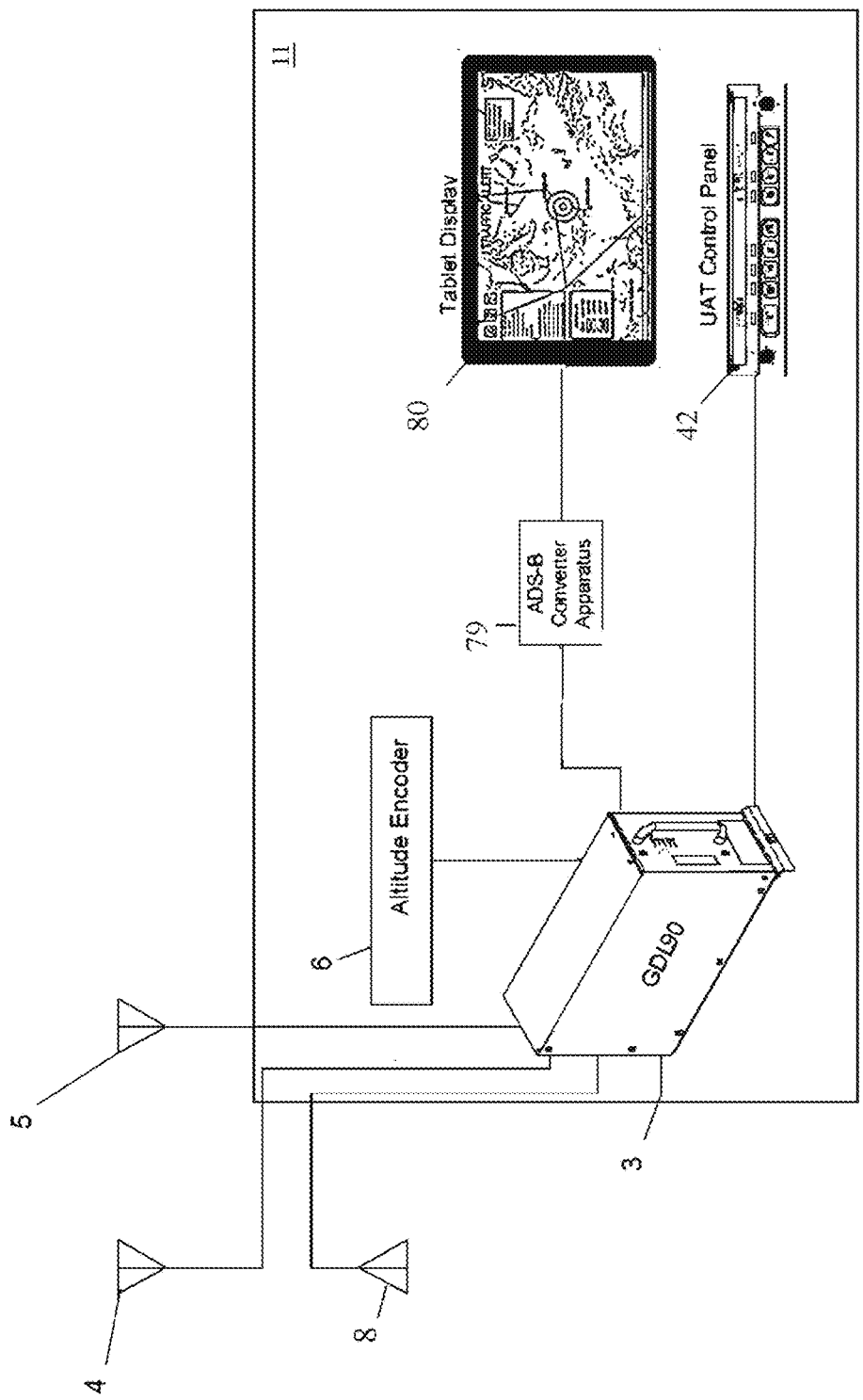
FIG. 19 illustrates the ADS-B system of FIG. 1 adapted for a general aviation manned aerial vehicle 11 for increased situational awareness and self-separation assurance.

In yet another embodiment designed for manned aircraft, an iPad™ or other tablet or portable computer may be equipped with the same UAS-ADS-B software resident at GCS 1 for traffic situational awareness of the pilot. FIG. 19 illustrates the ADS-B system of FIG. 1 adapted for a general aviation manned aerial vehicle 11 for increased situational awareness and self-separation assurance. In this instance the GCS display 44 is replaced by one or more onboard portable tablet computers 80 having one or more processors using touch screen display(s) and interfaced as described previously. The tablet(s) 80 and control panel 42 are provided to the pilot in the cockpit of the conventional aircraft 11, and are connected directly to the UAT 3 for enhanced ownship situational awareness of the airborne pilot. This embodiment also employs a dedicated converter 79 with memory buffers (similar to 25 described above) for converting the consolidated ADS-B Out and ADS-B In messages to the proper serial protocol of the tablet(s) 80 via direct serial communications. This embodiment also employs a dedicated ASAP 45 with one or more processors, wherein the software and algorithms reside for conflict detection and conflict resolution. This embodiment also employs a dedicated radar 19 with one or more processors, wherein the software and algorithms detect and track non-cooperative targets for collision avoidance.

It should be understood that various changes may be made in the form, details, arrangement and proportions of the components. Such changes do not depart from the scope of the invention which comprises the matter shown and described herein and set forth in the appended claims.

The invention claimed is:

1. An ADS-B system coupled to an unmanned aerial vehicle for increased situational awareness and self-separation assurance comprising:
    a telemetry system in said unmanned aerial vehicle, said telemetry system including a transceiver for wireless communication with a ground control station;
    at least one GPS/WAAS antenna disposed on said unmanned aerial vehicle;
    a radar system in said unmanned aerial vehicle;
    at least one radar antenna disposed on said unmanned aerial vehicle and connected to said radar system;
    at least one altitude encoder,
    a Universal Access Transceiver (UAT) in said unmanned aerial vehicle and in communication with said telemetry system for compiling ownship ADS-B Out messages and for receiving air-to-air ADS-B In messages from nearby aircraft and ADS-R and TIS-B messages from ground based transceivers, said UAT further comprising a digital computer programmed with control software comprising computer instructions stored on non-transitory computer memory for storing said ADS-B In messages and consolidating said ADS-B In messages with said ADS-B Out messages, and for communicating said consolidated ADS-B Out messages to said telemetry system for transmission to said ground control station;
    at least an upper and lower UAT antenna disposed on said unmanned aerial vehicle and connected to said UAT; and
    said ground control station (GCS) comprising a digital computer programmed with control software stored on non-transitory computer memory, said software including,
        a loss link redundancy module to compensate for a lost telemetry link, a translation module for generating KML scripts from the ADS-B Out and ADS-B In data, and
        a synthetic display management user-interface for providing a synthetic user-configurable three-dimensional display of said ADS-B Out and ADS-B In data on a geobrowser.

2. The system according to claim 1, wherein said radar comprises a target feature extraction software module.

3. The system according to claim 2, further comprising a sense and avoid processor disposed in said unmanned aerial vehicle in communication with said radar for fusing targets identified by said radar target feature extraction module with said consolidated ADS-B In and ADS-B Out messages from said UAT into fused radar/ADS-B In message reports.

4. The system according to claim 3, wherein the fused radar/ADS-B In message reports are temporarily stored by said sense and avoid processor.

5. The system according to claim 4, wherein the fused radar/ADS-B In message reports are time-tagged.

6. The system according to claim 5, wherein the stored and time-tagged message reports are encoded in packet-based radar/ADS-B messages.

7. The system according to claim 6, wherein the packet-based radar/ADS-B messages are transmitted to the GCS.

8. The system according to claim 7, wherein the GCS digital computer is programmed with control software further including a self-separation assurance alerting module for detection and alerting of potential collisions using a plurality of geometric and concentric collision zones of said unmanned aerial vehicle with traffic during airborne and ground operations.

9. The system according to claim 5, wherein the UAT digital computer includes memory for temporarily storing said ADS-B In message reports, and said computer control software includes computer instructions stored on non-transitory computer memory for encoding said ADS-B In message reports in packet-based ADS-B messages for transmission via said telemetry system by serial asynchronous communications to the GCS.

10. The system according to claim 1, further comprising a first converter in said unmanned aerial vehicle for converting said consolidated ADS-B Out messages from a first serial transmission protocol output from said UAT into a second serial transmission protocol for communication to said telemetry system.

11. The system according to claim 10, further comprising a second converter in said GCS for converting said second serial transmission protocol from said telemetry system to a third serial transmission protocol for the GCS digital computer.

12. The system according to claim 11, wherein said first converter comprises an RS-232/422 converter and said second converter comprises an RS-422/232 converter to convert between the second data communication protocol of the telemetry system to the third serial transmission protocol for the GCS digital computer.

13. The system according to claim 10, wherein said first converter comprises an RS-232/422 converter.

14. The system according to claim 1, wherein the UAT digital computer control software includes computer instructions stored on non-transitory computer memory for compiling ownship ADS-B Out messages, ADS-B In messages from aircraft nearby, and air-to-ground ADS-R and TIS-B messages from ADS-B ground based transceiver(s) into ADS-B/ADS-R/TIS-B message reports.

15. An ADS-B system coupled to an unmanned aerial vehicle comprising:
    a radar system in said unmanned aerial vehicle;
    at least one radar antenna disposed on said unmanned aerial vehicle;
    a Universal Access Transceiver (UAT) for compiling ownship ADS-B Out messages and radar target data and for receiving air-to-air ADS-B In messages from nearby aircraft and ADS-R and TIS-B messages from ground based transceivers, said UAT comprising a digital computer programmed with control software comprising computer instructions stored on non-transitory computer memory for storing said ADS-B In messages and consolidating said ADS-B In messages with said ADS-B Out messages,
    a transceiver for telemetering said consolidated ADS-B Out/radar messages in said UAT serial protocol to a ground control station; and
    said ground control station (GCS) comprising a digital computer programmed with control software for compensating for a lost telemetry link with said UAT, said loss link software including instructions stored on non-transitory computer memory for determining when radio telemetry with said unmanned aerial vehicle has failed and automatically arbitrating to a backup redundant data source for the ADS-B data.

16. The system according to claim 15, wherein said loss link software determines when radio telemetry with said unmanned aerial vehicle has failed by performing a CRC checksum on the ADS-B data.

17. The system according to claim 16, wherein said loss link software automatically arbitrates back to the unmanned aerial vehicle data source for the ADS-B data when said CRC checksum passes.

18. An ADS-B system coupled to an unmanned aerial vehicle comprising:
- a Universal Access Transceiver (UAT) for compiling ownship ADS-B Out messages and for receiving air-to-air ADS-B In messages from nearby aircraft and ADS-R and TIS-B messages from ground based transceivers, said UAT further comprising a digital computer programmed with control software comprising computer instructions stored on non-transitory computer memory for storing said ADS-B In messages and consolidating said ADS-B In messages with said ADS-B Out messages,
- a radar system in said unmanned aerial vehicle;
- at least one radar antenna disposed on said unmanned aerial vehicle;
- a sense and avoid processor disposed in said unmanned aerial vehicle in communication with said radar and UAT for fusing targets identified by said radar with said consolidated ADS-B In and ADS-B Out messages from said UAT into fused radar/ADS-B In message reports;
- a transceiver for telemetering said fused radar/ADS-B In message reports to a ground control station; and
- said ground control station (GCS) comprising a digital computer programmed with control software stored on non-transitory computer memory for establishing a plurality of geometric collision zones about the moving unmanned aerial vehicle, each representing the actual position of the unmanned aerial vehicle within a defined region of interest.

19. The system according to claim 18, wherein said radar comprises a target feature extraction software module.

20. The system according to claim 19, wherein the fused radar/ADS-B In message reports are temporarily stored by said sense and avoid processor, time-tagged, encoded in packet-based radar/ADS-B messages, and then transmitted to the GCS.

21. The system of claim 18, wherein each of said regions of interest are separated by a pre-determined distance to allow time for unmanned aerial vehicle self-separation via direct control by the GCS.

22. The system of claim 18, wherein all of said regions of interest are concentric.

23. The system of claim 18, wherein said sense and avoid processor with said algorithm commands resolution advisories for autonomous unmanned aerial vehicle self-separation and collision avoidance.

* * * * *